United States Patent [19]
Dempsey

[11] Patent Number: 5,861,888
[45] Date of Patent: Jan. 19, 1999

[54] METHOD AND A SYSTEM FOR THE NONLINEAR STORAGE OF A TEXTURE MAP WITHIN A LINEAR MEMORY DEVICE

[76] Inventor: Morgan James Dempsey, 9412 S. 43 Pl., Phoenix, Ariz. 85044

[21] Appl. No.: 753,705

[22] Filed: Nov. 27, 1996

[51] Int. Cl.[6] .................................................. G06T 11/40
[52] U.S. Cl. ............................................................ 345/430
[58] Field of Search .................................. 345/430, 423, 345/424, 425, 429, 521

[56] References Cited

U.S. PATENT DOCUMENTS

| 5,394,553 | 2/1995 | Lee | 395/800 |
|---|---|---|---|
| 5,519,829 | 5/1996 | Wilson | 395/164 |
| 5,557,712 | 9/1996 | Guay | 345/430 |
| 5,596,687 | 1/1997 | Peters, Jr. | 345/430 |
| 5,606,650 | 2/1997 | Kelley et al. | 345/430 |

*Primary Examiner*—Cliff N. Vo
*Attorney, Agent, or Firm*—Woodard, Emhardt, Naughton, Moriarty & McNett

[57] ABSTRACT

A method and a system for the nonlinear storage of data points of a texture map matrix within a linear memory device has two embodiments. A first embodiment involves the implementation of subdividing the texture map matrix into storage matrixes, and storing each storage matrix into distinct memory locations within the linear memory device. Each storage matrix includes at least one pair of adjacent data points from two adjacent row of data points. As a result, data points of the texture map matrix are in a nonlinear storage arrangement within the linear memory device. A second embodiment involves the implementation of subdividing the rows of the texture map matrix into multi-data point groups, and placing adjacent multi-data point groups into a linear string. The linear string is subsequently written to the linear memory device. As a result, data points of the texture map matrix are in a nonlinear storage arrangement within the linear memory device.

20 Claims, 24 Drawing Sheets

| MEMORY LOCATIONS | 0-7 | 8-15 | 16-23 | 24-31 | 32-39 | 40-47 | 48-55 | 56-63 |
|---|---|---|---|---|---|---|---|---|
| 000000 | T(0,0) | T(0,1) | T(0,2) | T(0,3) | T(0,4) | T(0,5) | T(0,6) | T(0,7) |
| 000001 | T(0,8) | T(0,9) | T(0,A) | T(0,B) | T(0,C) | T(0,D) | T(0,E) | T(0,F) |
| 000010 | T(1,0) | T(1,1) | T(1,2) | T(1,3) | T(1,4) | T(1,5) | T(1,6) | T(1,7) |
| 000011 | T(1,8) | T(1,9) | T(1,A) | T(1,B) | T(1,C) | T(1,D) | T(1,E) | T(1,F) |
| 000100 | T(2,0) | T(2,1) | T(2,2) | T(2,3) | T(2,4) | T(2,5) | T(2,6) | T(2,7) |
| 000101 | T(2,8) | T(2,9) | T(2,A) | T(2,B) | T(2,C) | T(2,D) | T(2,E) | T(2,F) |
| 000110 | T(3,0) | T(3,1) | T(3,2) | T(3,3) | T(3,4) | T(3,5) | T(3,6) | T(3,7) |
| 000111 | T(3,8) | T(3,9) | T(3,A) | T(3,B) | T(3,C) | T(3,D) | T(3,E) | T(3,F) |
| 001000 | T(4,0) | T(4,1) | T(4,2) | T(4,3) | T(4,4) | T(4,5) | T(4,6) | T(4,7) |
| 001001 | T(4,8) | T(4,9) | T(4,A) | T(4,B) | T(4,C) | T(4,D) | T(4,E) | T(4,F) |
| 001010 | T(5,0) | T(5,1) | T(5,2) | T(5,3) | T(5,4) | T(5,5) | T(5,6) | T(5,7) |
| 001011 | T(5,8) | T(5,9) | T(5,A) | T(5,B) | T(5,C) | T(5,D) | T(5,E) | T(5,F) |
| 001100 | T(6,0) | T(6,1) | T(6,2) | T(6,3) | T(6,4) | T(6,5) | T(6,6) | T(6,7) |
| 001101 | T(6,8) | T(6,9) | T(6,A) | T(6,B) | T(6,C) | T(6,D) | T(6,E) | T(6,F) |
| 001110 | T(7,0) | T(7,1) | T(7,2) | T(7,3) | T(7,4) | T(7,5) | T(7,6) | T(7,7) |
| 001111 | T(7,8) | T(7,9) | T(7,A) | T(7,B) | T(7,C) | T(7,D) | T(7,E) | T(7,F) |

BIT LOCATIONS

| MEMORY LOCATIONS | 0-7 | 8-15 | 16-23 | 24-31 | 32-39 | 40-47 | 48-55 | 56-63 |
|---|---|---|---|---|---|---|---|---|
| 010000 | T(8,0) | T(8,1) | T(8,2) | T(8,3) | T(8,4) | T(8,5) | T(8,6) | T(8,7) |
| 010001 | T(8,8) | T(8,9) | T(8,A) | T(8,B) | T(8,C) | T(8,D) | T(8,E) | T(8,F) |
| 010010 | T(9,0) | T(9,1) | T(9,2) | T(9,3) | T(9,4) | T(9,5) | T(9,6) | T(9,7) |
| 010011 | T(9,8) | T(9,9) | T(9,A) | T(9,B) | T(9,C) | T(9,D) | T(9,E) | T(9,F) |
| 010100 | T(A,0) | T(A,1) | T(A,2) | T(A,3) | T(A,4) | T(A,5) | T(A,6) | T(A,7) |
| 010101 | T(A,8) | T(A,9) | T(A,A) | T(A,B) | T(A,C) | T(A,D) | T(A,E) | T(A,F) |
| 010110 | T(B,0) | T(B,1) | T(B,2) | T(B,3) | T(B,4) | T(B,5) | T(B,6) | T(B,7) |
| 010111 | T(B,8) | T(B,9) | T(B,A) | T(B,B) | T(B,C) | T(B,D) | T(B,E) | T(B,F) |
| 011000 | T(C,0) | T(C,1) | T(C,2) | T(C,3) | T(C,4) | T(C,5) | T(C,6) | T(C,7) |
| 011001 | T(C,8) | T(C,9) | T(C,A) | T(C,B) | T(C,C) | T(C,D) | T(C,E) | T(C,F) |
| 011010 | T(D,0) | T(D,1) | T(D,2) | T(D,3) | T(D,4) | T(D,5) | T(D,6) | T(D,7) |
| 011011 | T(D,8) | T(D,9) | T(D,A) | T(D,B) | T(D,C) | T(D,D) | T(D,E) | T(D,F) |
| 011100 | T(E,0) | T(E,1) | T(E,2) | T(E,3) | T(E,4) | T(E,5) | T(E,6) | T(E,7) |
| 011101 | T(E,8) | T(E,9) | T(E,A) | T(E,B) | T(E,C) | T(E,D) | T(E,E) | T(E,F) |
| 011110 | T(F,0) | T(F,1) | T(F,2) | T(F,3) | T(F,4) | T(F,5) | T(F,6) | T(F,7) |
| 011111 | T(F,8) | T(F,9) | T(F,A) | T(F,B) | T(F,C) | T(F,D) | T(F,E) | T(F,F) |

BIT LOCATIONS

Table (upper, 20b): Memory Locations 010000–011111

| Memory Locations | 0-7 | 8-15 | 16-23 | 24-31 | 32-39 | 40-47 | 48-55 | 56-63 |
|---|---|---|---|---|---|---|---|---|
| 010000 | T(8,0) | T(8,1) | T(8,2) | T(8,3) | T(9,0) | T(9,1) | T(9,2) | T(9,3) |
| 010001 | T(8,4) | T(8,5) | T(8,6) | T(8,7) | T(9,4) | T(9,5) | T(9,6) | T(9,7) |
| 010010 | T(8,8) | T(8,9) | T(8,A) | T(8,B) | T(9,8) | T(9,9) | T(9,A) | T(9,B) |
| 010011 | T(8,C) | T(8,D) | T(8,E) | T(8,F) | T(9,C) | T(9,D) | T(9,E) | T(9,F) |
| 010100 | T(A,0) | T(A,1) | T(A,2) | T(A,3) | T(B,0) | T(B,1) | T(B,2) | T(B,3) |
| 010101 | T(A,4) | T(A,5) | T(A,6) | T(A,7) | T(B,4) | T(B,5) | T(B,6) | T(B,7) |
| 010110 | T(A,8) | T(A,9) | T(A,A) | T(A,B) | T(B,8) | T(B,9) | T(B,A) | T(B,B) |
| 010111 | T(A,C) | T(A,D) | T(A,E) | T(A,F) | T(B,C) | T(B,D) | T(B,E) | T(B,F) |
| 011000 | T(C,0) | T(C,1) | T(C,2) | T(C,3) | T(D,0) | T(D,1) | T(D,2) | T(D,3) |
| 011001 | T(C,4) | T(C,5) | T(C,6) | T(C,7) | T(D,4) | T(D,5) | T(D,6) | T(D,7) |
| 011010 | T(C,8) | T(C,9) | T(C,A) | T(C,B) | T(D,8) | T(D,9) | T(D,A) | T(D,B) |
| 011011 | T(C,C) | T(C,D) | T(C,E) | T(C,F) | T(D,C) | T(D,D) | T(D,E) | T(D,F) |
| 011100 | T(E,0) | T(E,1) | T(E,2) | T(E,3) | T(F,0) | T(F,1) | T(F,2) | T(F,3) |
| 011101 | T(E,4) | T(E,5) | T(E,6) | T(E,7) | T(F,4) | T(F,5) | T(F,6) | T(F,7) |
| 011110 | T(E,8) | T(E,9) | T(E,A) | T(E,B) | T(F,8) | T(F,9) | T(F,A) | T(F,B) |
| 011111 | T(E,C) | T(E,D) | T(E,E) | T(E,F) | T(F,C) | T(F,D) | T(F,E) | T(F,F) |

Table (lower): Memory Locations 000000–001111

| Memory Locations | 0-7 | 8-15 | 16-23 | 24-31 | 32-39 | 40-47 | 48-55 | 56-63 |
|---|---|---|---|---|---|---|---|---|
| 000000 | T(0,0) | T(0,1) | T(0,2) | T(0,3) | T(1,0) | T(1,1) | T(1,2) | T(1,3) |
| 000001 | T(0,4) | T(0,5) | T(0,6) | T(0,7) | T(1,4) | T(1,5) | T(1,6) | T(1,7) |
| 000010 | T(0,8) | T(0,9) | T(0,A) | T(0,B) | T(1,8) | T(1,9) | T(1,A) | T(1,B) |
| 000011 | T(0,C) | T(0,D) | T(0,E) | T(0,F) | T(1,C) | T(1,D) | T(1,E) | T(1,F) |
| 000100 | T(2,0) | T(2,1) | T(2,2) | T(2,3) | T(3,0) | T(3,1) | T(3,2) | T(3,3) |
| 000101 | T(2,4) | T(2,5) | T(2,6) | T(2,7) | T(3,4) | T(3,5) | T(3,6) | T(3,7) |
| 000110 | T(2,8) | T(2,9) | T(2,A) | T(2,B) | T(3,8) | T(3,9) | T(3,A) | T(3,B) |
| 000111 | T(2,C) | T(2,D) | T(2,E) | T(2,F) | T(3,C) | T(3,D) | T(3,E) | T(3,F) |
| 001000 | T(4,0) | T(4,1) | T(4,2) | T(4,3) | T(5,0) | T(5,1) | T(5,2) | T(5,3) |
| 001001 | T(4,4) | T(4,5) | T(4,6) | T(4,7) | T(5,4) | T(5,5) | T(5,6) | T(5,7) |
| 001010 | T(4,8) | T(4,9) | T(4,A) | T(4,B) | T(5,8) | T(5,9) | T(5,A) | T(5,B) |
| 001011 | T(4,C) | T(4,D) | T(4,E) | T(4,F) | T(5,C) | T(5,D) | T(5,E) | T(5,F) |
| 001100 | T(6,0) | T(6,1) | T(6,2) | T(6,3) | T(7,0) | T(7,1) | T(7,2) | T(7,3) |
| 001101 | T(6,4) | T(6,5) | T(6,6) | T(6,7) | T(7,4) | T(7,5) | T(7,6) | T(7,7) |
| 001110 | T(6,8) | T(6,9) | T(6,A) | T(6,B) | T(7,8) | T(7,9) | T(7,A) | T(7,B) |
| 001111 | T(6,C) | T(6,D) | T(6,E) | T(6,F) | T(7,C) | T(7,D) | T(7,E) | T(7,F) |

| MEMORY LOCATIONS | 0-7 | 8-15 | 16-23 | 24-31 | 32-39 | 40-47 | 48-55 | 56-63 | 64-71 | 72-79 | 80-87 | 88-95 | 96-103 | 104-111 | 112-119 | 120-127 |
|---|---|---|---|---|---|---|---|---|---|---|---|---|---|---|---|---|
| 000000 | T(0,0) | T(0,1) | T(0,2) | T(0,3) | T(1,0) | T(1,1) | T(1,2) | T(1,3) | T(2,0) | T(2,1) | T(2,2) | T(2,3) | T(3,0) | T(3,1) | T(3,2) | T(3,3) |
| 000001 | T(0,4) | T(0,5) | T(0,6) | T(0,7) | T(1,4) | T(1,5) | T(1,6) | T(1,7) | T(2,4) | T(2,5) | T(2,6) | T(2,7) | T(3,4) | T(3,5) | T(3,6) | T(3,7) |
| 000010 | T(0,8) | T(0,9) | T(0,A) | T(0,B) | T(1,8) | T(1,9) | T(1,A) | T(1,B) | T(2,8) | T(2,9) | T(2,A) | T(2,B) | T(3,8) | T(3,9) | T(3,A) | T(3,B) |
| 000011 | T(0,C) | T(0,D) | T(0,E) | T(0,F) | T(1,C) | T(1,D) | T(1,E) | T(1,F) | T(2,C) | T(2,D) | T(2,E) | T(2,F) | T(3,C) | T(3,D) | T(3,E) | T(3,F) |
| 000100 | T(4,0) | T(4,1) | T(4,2) | T(4,3) | T(5,0) | T(5,1) | T(5,2) | T(5,3) | T(6,0) | T(6,1) | T(6,2) | T(6,3) | T(7,0) | T(7,1) | T(7,2) | T(7,3) |
| 000101 | T(4,4) | T(4,5) | T(4,6) | T(4,7) | T(5,4) | T(5,5) | T(5,6) | T(5,7) | T(6,4) | T(6,5) | T(6,6) | T(6,7) | T(7,4) | T(7,5) | T(7,6) | T(7,7) |
| 000110 | T(4,8) | T(4,9) | T(4,A) | T(4,B) | T(5,8) | T(5,9) | T(5,A) | T(5,B) | T(6,8) | T(6,9) | T(6,A) | T(6,B) | T(7,8) | T(7,9) | T(7,A) | T(7,B) |
| 000111 | T(4,C) | T(4,D) | T(4,E) | T(4,F) | T(5,C) | T(5,D) | T(5,E) | T(5,F) | T(6,C) | T(6,D) | T(6,E) | T(6,F) | T(7,C) | T(7,D) | T(7,E) | T(7,F) |
| 001000 | T(8,0) | T(8,1) | T(8,2) | T(8,3) | T(9,0) | T(9,1) | T(9,2) | T(9,3) | T(A,0) | T(A,1) | T(A,2) | T(A,3) | T(B,0) | T(B,1) | T(B,2) | T(B,3) |
| 001001 | T(8,4) | T(8,5) | T(8,6) | T(8,7) | T(9,4) | T(9,5) | T(9,6) | T(9,7) | T(A,4) | T(A,5) | T(A,6) | T(A,7) | T(B,4) | T(B,5) | T(B,6) | T(B,7) |
| 001010 | T(8,8) | T(8,9) | T(8,A) | T(8,B) | T(9,8) | T(9,9) | T(9,A) | T(9,B) | T(A,8) | T(A,9) | T(A,A) | T(A,B) | T(B,8) | T(B,9) | T(B,A) | T(B,B) |
| 001011 | T(8,C) | T(8,D) | T(8,E) | T(8,F) | T(9,C) | T(9,D) | T(9,E) | T(9,F) | T(A,C) | T(A,D) | T(A,E) | T(A,F) | T(B,C) | T(B,D) | T(B,E) | T(B,F) |
| 001100 | T(C,0) | T(C,1) | T(C,2) | T(C,3) | T(D,0) | T(D,1) | T(D,2) | T(D,3) | T(E,0) | T(E,1) | T(E,2) | T(E,3) | T(F,0) | T(F,1) | T(F,2) | T(F,3) |
| 001101 | T(C,4) | T(C,5) | T(C,6) | T(C,7) | T(D,4) | T(D,5) | T(D,6) | T(D,7) | T(E,4) | T(E,5) | T(E,6) | T(E,7) | T(F,4) | T(F,5) | T(F,6) | T(F,7) |
| 001110 | T(C,8) | T(C,9) | T(C,A) | T(C,B) | T(D,8) | T(D,9) | T(D,A) | T(D,B) | T(E,8) | T(E,9) | T(E,A) | T(E,B) | T(F,8) | T(F,9) | T(F,A) | T(F,B) |
| 001111 | T(C,C) | T(C,D) | T(C,E) | T(C,F) | T(D,C) | T(D,D) | T(D,E) | T(D,F) | T(E,C) | T(E,D) | T(E,E) | T(E,F) | T(F,C) | T(F,D) | T(F,E) | T(F,F) |

BIT LOCATIONS

20c

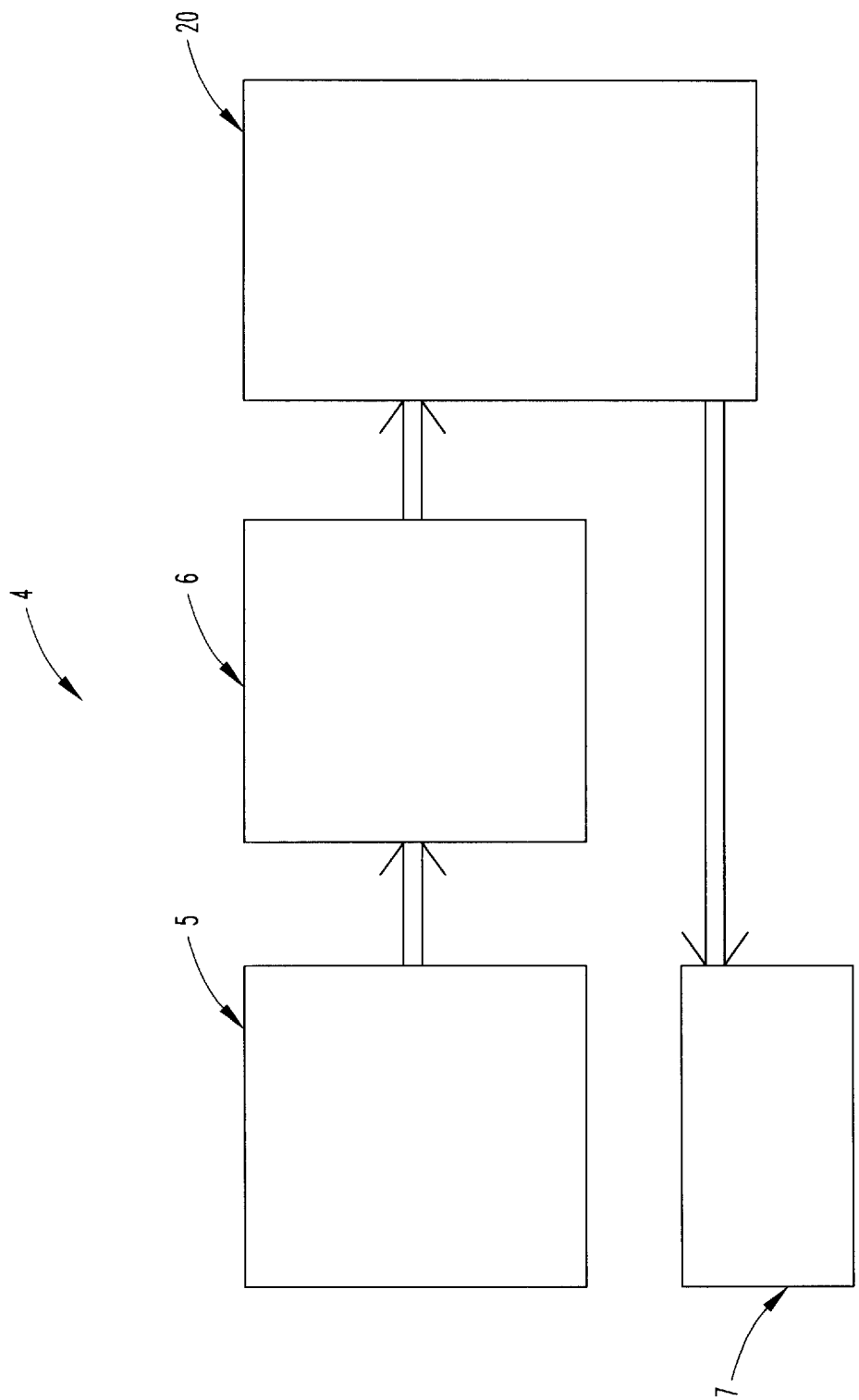

METHOD AND A SYSTEM FOR THE NONLINEAR STORAGE OF A TEXTURE MAP WITHIN A LINEAR MEMORY DEVICE

BACKGROUND OF THE INVENTION

The present invention generally relates to the storage of data points within a memory device, and more specifically, to a nonlinear storage arrangement of a texture map within a linear memory device.

Figure 1:
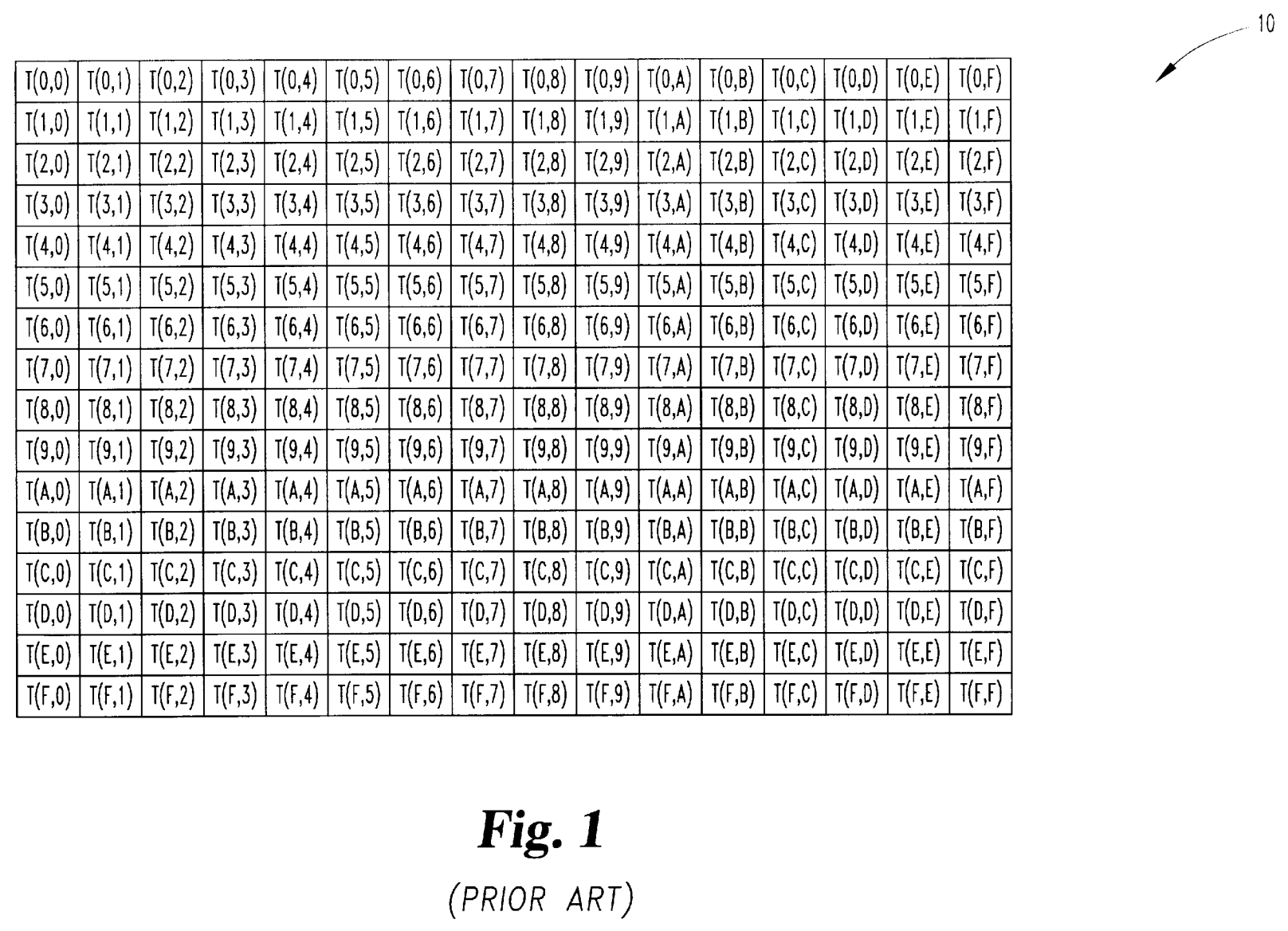

FIG. 1 is an illustration of a texture map matrix 10 of data points T(0,0)–T(F,F). Texture map matrix 10 includes sixteen rows and sixteen columns of data points, and each data point of texture map matrix 10 includes eight bits of information. Data points T(0,0)–T(F,F) can represent any form of texture data such as true color data, compressed texture data, and palletized data.

Traditionally, a computer processor is either designed and/or programmed to store data points T(0,0)–T(F,F) in a linear arrangement within sequential memory locations of a linear memory device. The particular linear storage arrangement of data points T(0,0)–T(F,F) within the sequential memory locations is solely dependent upon the bit width of each memory location. For example, FIG. 2 illustrates a linear storage arrangement of data points T(0,0)–T(F,F) within sequential memory locations 000000–111111 of a linear memory device 20a. Each memory location of linear memory device 20a is thirty-two bits, and therefore, four distinct data points of texture map matrix 10 is stored within each memory location. As illustrated in FIG. 3, a second linear storage arrangement of data points T(0,0)–T(F,F) within sequential memory locations 000000–011111 of a linear memory device 20b has eight distinct data points of texture map matrix 10 within each memory location due to the bit width of each memory location being sixty-four bits. As illustrated in FIG. 4, a third linear storage arrangement of data points T(0,0)–T(F,F) within sequential memory locations 000000–001111 of a linear memory device 20c has sixteen distinct data points of texture map matrix 10 within each memory location due to the bit width of each memory location being 128 bits.

A texel calculation of a bi-linear textured pixel from texture map matrix 10 consists of executing a weighted average of a submatrix of four adjacent data points of texture map matrix 10. The four adjacent data points comprise a texel matrix. Referring to FIG. 5, such texel matrixes are texel matrix 11a consisting of adjacent data points T(0,0), T(0,1), T(1,0) and T(1,1), texel matrix 11b consisting of adjacent data points T(4,3), T(4,4), T(5,3) and T(5,4), texel matrix 11c consisting of adjacent data points T(8,7), T(8,8), T(9,7) and T(9,8)}, texel matrix 11d consisting of adjacent data points T(B,B), T(B,C), T(C,B) and T(C,C), and texel matrix 11e consisting of adjacent data points T(E,E), T(E,F), T(F,E) and T(F,F).

Due to the linear storage arrangement of data points T(0,0)–T(F,F) illustrated in FIG. 2, memory reads of memory locations 000000 and 000100 of linear memory device 20a are required in order to retrieve data points T(0,0), T(0,1), T(1,0) and T(1,1) prior to executing a texel calculation of texel matrix 11a. Two memory reads of linear memory device 20a are also required prior to executing a texel calculation of texel matrix 11e. Furthermore, memory reads of memory locations 010000, 010001, 010100, and 010101 of linear memory device 20a are required in order to retrieve data points T(4,3), T(4,4), T(5,3) and T(5,4) prior to executing a texel calculation of texel matrix 11b. Four memory reads of linear memory device 20a are also required prior to executing a texel calculation of texel matrixes 11c, and 11d. It is to be appreciated and understood that two memory reads of linear memory device 20a are required for 75% of the possible texel calculations of texture map matrix 10, and four memory reads of linear memory device 20a are required for 25% of the possible texel calculations of texture map matrix 10. Consequently, the average number of memory reads of linear memory device 20a after the execution of all possible texel calculations of texture map matrix 10 is 2.50 memory reads.

Due to the linear storage arrangement of data points T(0,0)–T(F,F) illustrated in FIG. 3, memory reads of memory locations 000000 and 000010 of linear memory device 20b are required in order to retrieve data points T(0,0), T(0,1), T(1,0) and T(1,1) prior to executing a texel calculation of texel 11a. Two memory reads of linear memory device 20b are also required prior to executing a texel calculation of texel matrixes 11b, 11d, and 11e. Furthermore, memory reads of memory locations 010000, 010001, 010010, and 010011 of linear memory device 20b are required in order to retrieve data points T(8,7), T(8,8), T(9,7) and T(9,8) prior to executing a texel calculation of texel matrix 11c. It is to be appreciated and understood that two memory reads of linear memory device 20b are required for 87.5% of the possible texel calculations of texture map matrix 10 and four memory reads of linear memory device 20b are required for 12.5% of the possible texel calculations of texture map matrix. Consequently, the average number of memory reads of linear memory device 20b after the execution of all possible texel calculations of texture map matrix 10 is 2.25 memory reads.

Due to the linear storage arrangement of data points T(0,0)–T(F,F) illustrated in FIG. 4, memory reads of memory locations 000000 and 000001 of linear memory device 20c are required in order to retrieve data points T(0,0), T(0,1), T(1,0) and T(1,1) prior to executing a texel calculation of texel matrix 11a. It is to be appreciated and understood that two memory reads of linear memory device 20c are required prior to executing any of the possible texel calculations of texture map matrix 10. Consequently, the average number of memory reads of linear memory device 20c after the execution of all possible texel calculations of texture map matrix 10 is two memory reads.

A modified texel calculation of a bi-linear textured pixel from texture map matrix 10 consists of selecting the most heavily weighted texture data point of a texel matrix and then selecting the data point of the texel matrix that is diagonally across from most heavily weighted texture data point. A weighted average of the two data points is then executed. For example, referring back to FIG. 5, if data point T(0,0) is the most heavily weighted texture data point of texel matrix 11a, then data points T(0,0) and T(1,1) would be selected, and a weighted average of data points T(0,0) and T(1,1) would be executed. It is to be appreciated and understood that the number of memory reads required to execute a modified texel calculation of a particular texel matrix from texture map matrix 10 when texture map matrix 10 is in a linear storage arrangement within a linear memory device is the same as the number of memory reads required to execute a texel calculation of that particular texel matrix. Therefore, the average number of memory reads of linear memory device 20a of FIG. 2 after the execution of all possible modified texel calculations of texture map matrix 10 is 2.50 memory reads, the average number of memory reads of linear memory device 20b of FIG. 3 after the execution of all possible modified texel calculations of texture map matrix 10 is 2.25 memory reads, and the average number of memory reads of linear memory device 20c of FIG. 4 after the execution of all possible modified texel calculations of texture map matrix 10 is two memory reads.

While the speed performance of a system executing a single texel execution or modified texel calculation is normally insignificant, the speed performance of the system is very significant during the execution of multiple texel calculations and/or modified texel calculations. In effect, the greater the number of texel calculations and/or modified texel calculations executed by the system, the closer the speed performance of the system depends upon the average number of memory reads of the linear memory device. And, when the system executes all of the possible texel calculations and/or modified texel calculations of texture map matrix 10, the speed performance of the system is directly dependent on the average number of memory reads of the linear memory device. Consequently, a reduction in the average number of memory reads per execution of all of the possible texel calculations and/or modified texel calculations of texture map matrix 10 will improve the overall speed performance of the system during the execution of multiple texel calculations and/or modified texel calculations.

SUMMARY OF THE INVENTION

The present invention relates to a method and a system for the nonlinear storage of a plurality of data points of a texture map matrix within a plurality of memory locations of a linear memory device. Various aspects of the present invention are novel, non-obvious, and provide various advantages. While the actual nature of the present invention described in detail herein can only be determined with reference to the claims appended hereto, certain features which are characteristic of the present invention disclosed herein can be described briefly.

In accordance with one embodiment of the present invention, a processing circuit implements a step of determining a maximum number of the data points capable of being written to each memory location of a linear memory device during a writing cycle to the linear memory device. Based on the determination of the maximum number of data points, the processing circuit further implements a step of grouping the data points into two or more storage matrixes wherein each storage matrix includes at least one pair of adjacent data points from two adjacent rows of the texture map matrix. Subsequently, the processing circuit implements a step of storing each storage matrix into the memory locations of the linear memory device. The result is a nonlinear storage arrangement of the data points.

In accordance with a second embodiment of the present invention, a processing circuit implements a step of rearranging the data points from the texture map matrix into a linear string by subdividing adjacent rows of the texture map matrix into a plurality of multi-data point groups, and subsequently, placing the multi-datapoint groups next to each other in the linear string. A writing circuit implements a step of storing the linear string within the memory locations of the linear memory device. The result is a nonlinear storage arrangement of the data points.

It is an object of the present invention to provide a method for reducing the average numbers of memory reads achieved during the execution of all possible texel calculations and/or modified texel calculations of a texture map matrix.

It is another object of the present invention to provide a system having an improved speed performance during the execution of all possible texel calculations and/or modified texel calculations of a texture map matrix.

These and other objects as well as advantages of the present invention will become more apparent from the following description of the preferred embodiments.

BRIEF DESCRIPTION OF THE DRAWINGS

FIG. 1 is an illustration of texture map matrix 10.

FIG. 2 is an illustration of the linear storage arrangement of texture map matrix 10 within sequential memory locations 000000–111111 of linear memory device 20a.

FIG. 3 is an illustration of the second linear storage arrangement of texture map matrix 10 within sequential memory locations 000000–011111 of linear memory device 20b.

FIG. 4 is an illustration of the third linear storage arrangement of texture map matrix 10 within sequential memory locations 000000–001111 of linear memory device 20c.

FIG. 8 is an illustration of storage matrixes 12a–12bl stored within sequential memory locations 000000–111111 of linear memory device 20a in accordance with the first embodiment of the present invention.

FIG. 9 is an illustration of storage matrixes 13a–13af of texture map matrix 10 in accordance with the first embodiment of the present invention.

FIG. 10 is an illustration of storage matrixes 13a–13af stored within sequential memory locations 000000–011111 of linear memory device 20b in accordance with the first embodiment of the present invention.

FIG. 11 is an illustration of storage matrixes 14a–14p of texture map matrix 10 in accordance with the first embodiment of the present invention.

FIG. 12 is an illustration of storage matrixes 14a–14p stored within sequential memory locations 000000–001111 of linear memory device 20c in accordance with the first embodiment of the present invention.

FIG. 13B is a block diagram of a system 4 for storing texture map matrix 10 within linear memory device 20 in accordance with the second embodiment of the present invention.

FIG. 14 is an illustration of multi-data point groups 15a–15h of texture map matrix 10 in accordance with the second embodiment of the present invention.

FIG. 15A is an illustration of a first portion of a linear string 16 in accordance with the second embodiment of the present invention.

FIG. 15B is an illustration of a second portion of linear string 16 in accordance with the second embodiment of the present invention.

FIG. 16 is an illustration of multi-data point groups 17a–17d of texture map matrix 10 in accordance with the second embodiment of the present invention.

FIG. 17A is an illustration of a first portion of a linear string 18 in accordance with the second embodiment of the present invention.

FIG. 17B is an illustration of a second portion of linear string 18 in accordance with the second embodiment of the present invention.

FIG. 18 is an illustration of multi-data point groups 19a and 19b of texture map matrix 10 in accordance with the second embodiment of the present invention.

FIG. 19A is an illustration of a first portion of a linear string 21 in accordance with the second embodiment of the present invention.

FIG. 19B is an illustration of a second portion of linear string 21 in accordance with the second embodiment of the present invention.

DESCRIPTION OF THE PREFERRED EMBODIMENTS

Figure 5:
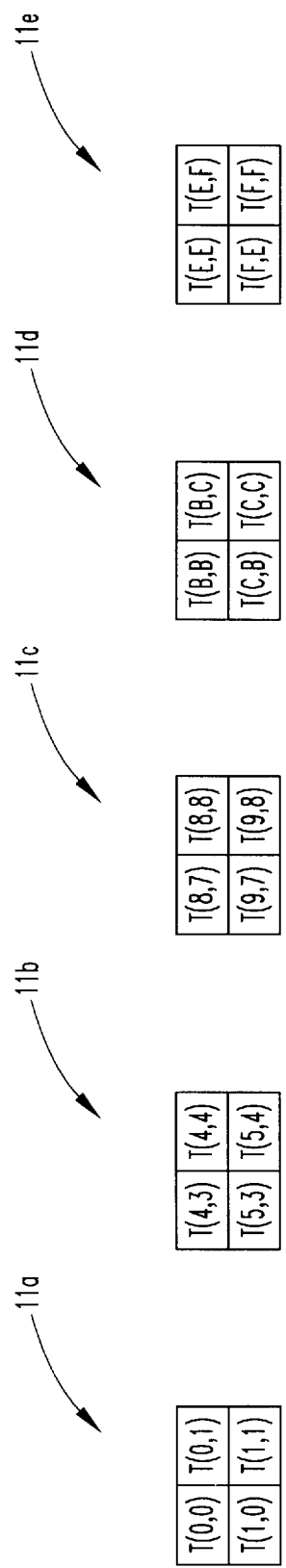
FIG. 5 is an illustration of texel matrixes 11a, 11b, 11c, 11d and 11e.

For the purposes of promoting an understanding of the principles of the present invention, reference will now be made to the embodiments illustrated in the drawings and specific language will be used to describe the same. It will nevertheless less be understood that no limitation of the scope of the present invention is thereby intended, such alterations and further modifications in the illustrated methods and systems, and such further applications of the principles of the present invention as illustrated therein being contemplated as would normally occur to one skilled in the art to which the present invention relates.

Figure 6A:
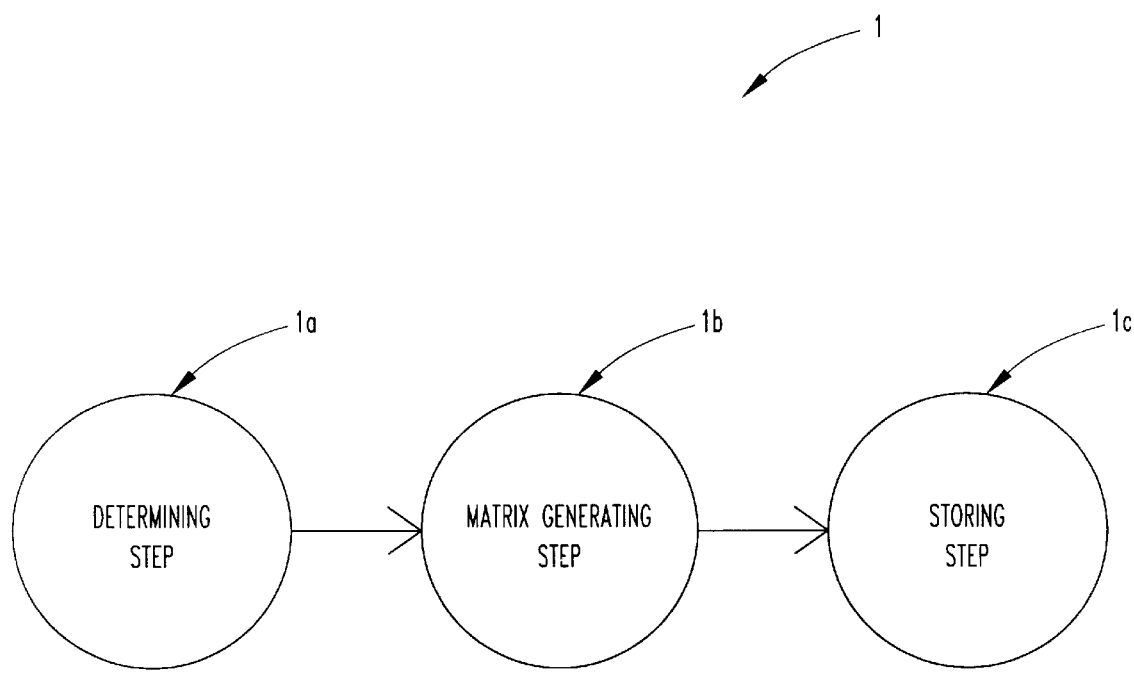
FIG. 6A is a flow diagram of a method 1 for storing texture map matrix 10 within a linear memory device in accordance with a first embodiment of the present invention.

FIG. 6A is a flow diagram of a method 1 of a first embodiment of the present invention. Method 1 includes a determining step 1a, a matrix generating step 1b, and a storing step 1c. Determining step 1a involves the act of ascertaining the bit width of each memory location of a linear memory device, such as linear memory devices 20a, 20b and 20c, and the act of ascertaining the bit size of each data point of a particular texture map matrix, such as data points T(0,0)–T(F,F) of texture map matrix 10. The bit width and bit size ascertainments allow for the determination of the maximum number of data points capable of being written to each memory location during a write cycle to the linear memory device. The present invention further contemplates that determining step 1a alternatively involves the act of selecting a linear memory device having a desired bit width of each memory location, and the act of selecting the bit size of each data point of a particular texture map matrix. The bit width and bit size selections also allows for the determination of the maximum number of data points capable of being written to each memory location during a write cycle to the linear memory device.

Matrix generating step 1b generates storage matrixes from the texture map matrix. Each storage matrix is a submatrix of the texture map matrix. Matrix generating step 1b involves the act of dividing the total number of data points by the determined maximum number of data points per memory location to obtain a number of data points per storage matrix and the further act of grouping the data points into storage matrixes. It is essential that each storage matrix include at least one pair of adjacent data points from adjacent rows. Storing step 1c involves the act of writing each generated storage matrix to a distinct memory location within the linear memory device. The result of executing method 1 is a nonlinear storage arrangement of a texture map matrix within a linear memory device.

Figure 6B:
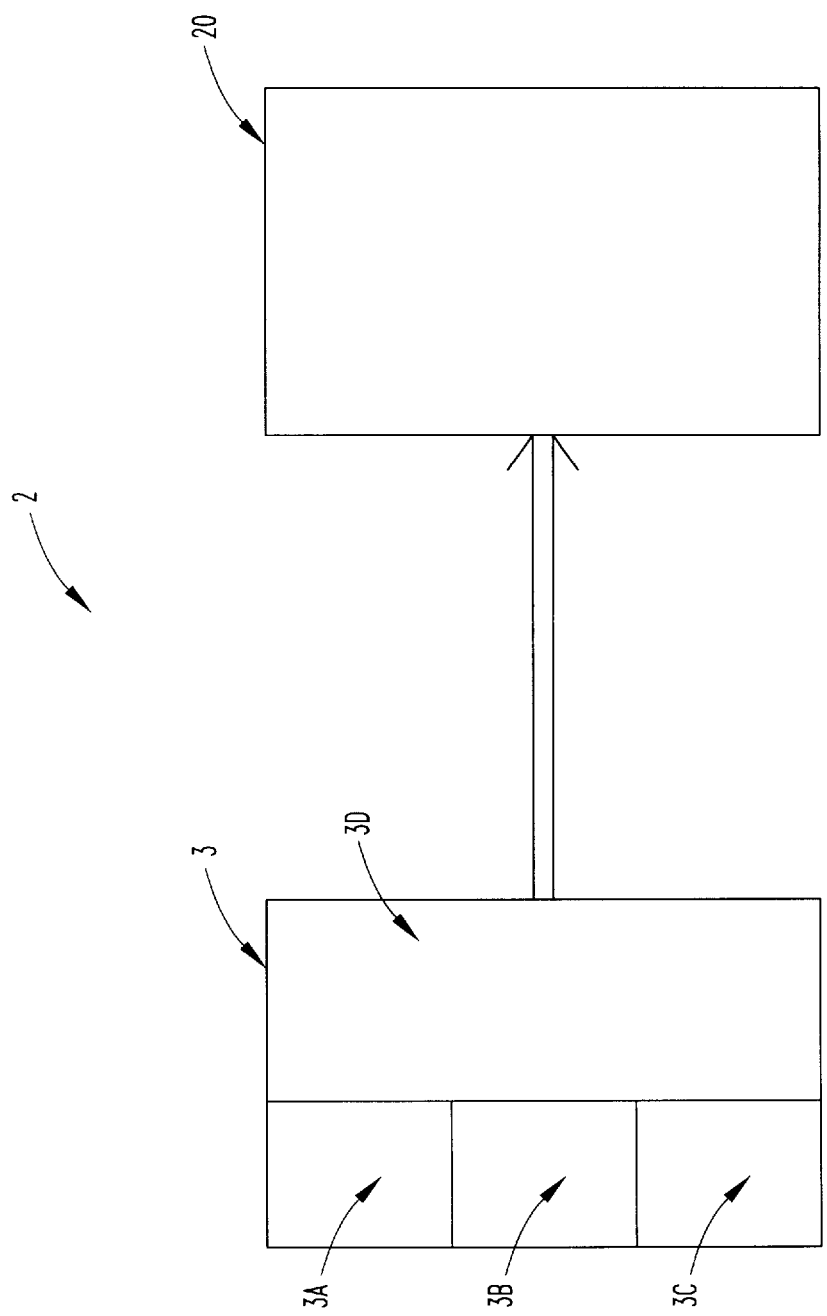
FIG. 6B is a block diagram of a system 2 for storing texture map matrix 10 within a linear memory device 20 in accordance with the first embodiment of the present invention.

FIG. 6B is a flow diagram of a system 2 of the first embodiment of the present invention. System 2 comprises a linear memory device 20 and a processing circuit 3. Linear memory device 20 includes a plurality of memory locations. While the present invention contemplates that linear memory device 20 is a main memory or a graphics frame memory of system 2, linear memory device 20 can be represent any type of memory for system 2. Further, the present invention contemplates that the memory locations of linear memory device 20 can be any bit width.

Processing circuit 3 includes a first component 3a, a second component 3b, and a third component 3c. First component 3a is circuitry designed and/or programmed to perform the bit width and bit size ascertainments of determining step 1a in consideration of linear memory device 20. Alternatively, while the present invention contemplates that first component 3a will be compatible with linear memory device 20 regardless of the bid width of each memory location of linear memory device 20, first component 3a can be designed and/or programmed to interact with linear memory device 20 having a selected bit width of each memory location for a selected bit size of each data point of a particular texture map matrix. In this case, the maximum number of data points per memory location of linear memory device 20 can also be determined. Second component 3b is circuitry designed /or programmed to perform matrix generating step 1b in response to a communication of the determined maximum number of data points per memory location linear memory device 20 from first component 3a.

Third component 3c is circuitry designed and/or programmed to perform storing step 1c after the execution of matrix generating step 1b by second component 3b. Third component 3c writes each storage matrix from second component 3b to a distinct memory location of linear memory device 20. The present invention contemplates that third component 3c can write the storage matrixes to sequential and/or nonsequential memory locations. Processing circuit 3 may further comprise a fourth component 3d. Fourth component 3d is circuitry designed and/or programmed to execute texel calculations and/or modified texel calculations on the texel matrixes of the stored data points within linear memory device 20.

The following is a specific description of the nonlinear storage arrangement of texture map matrix 10 within linear memory devices 20a, 20b, and 20c in accordance with the first embodiment of the present invention.

Figure 7:
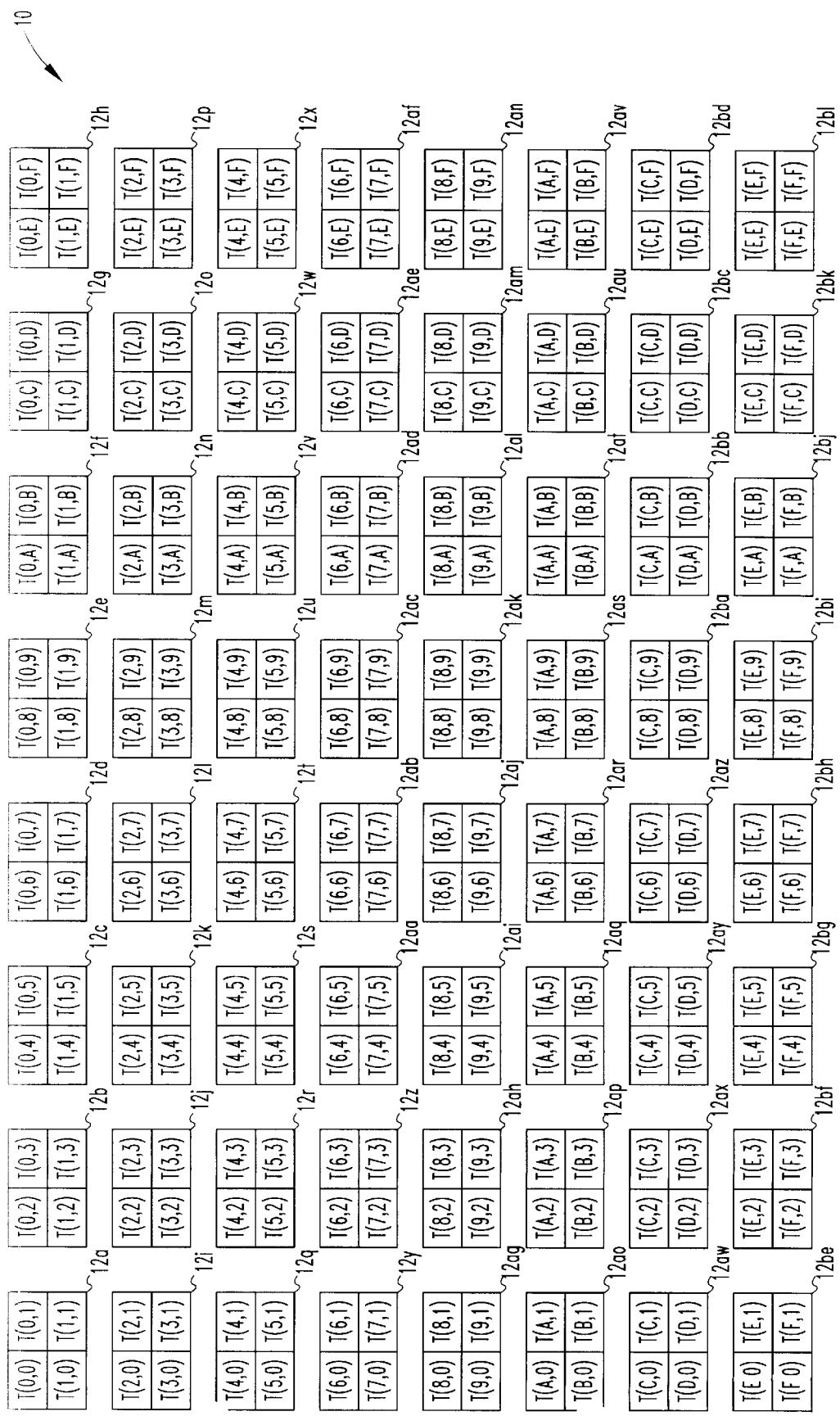
FIG. 7 is an illustration of storage matrixes 12a–12bl of texture map matrix 10 in accordance with the first embodiment of the present invention.
Figure 8:
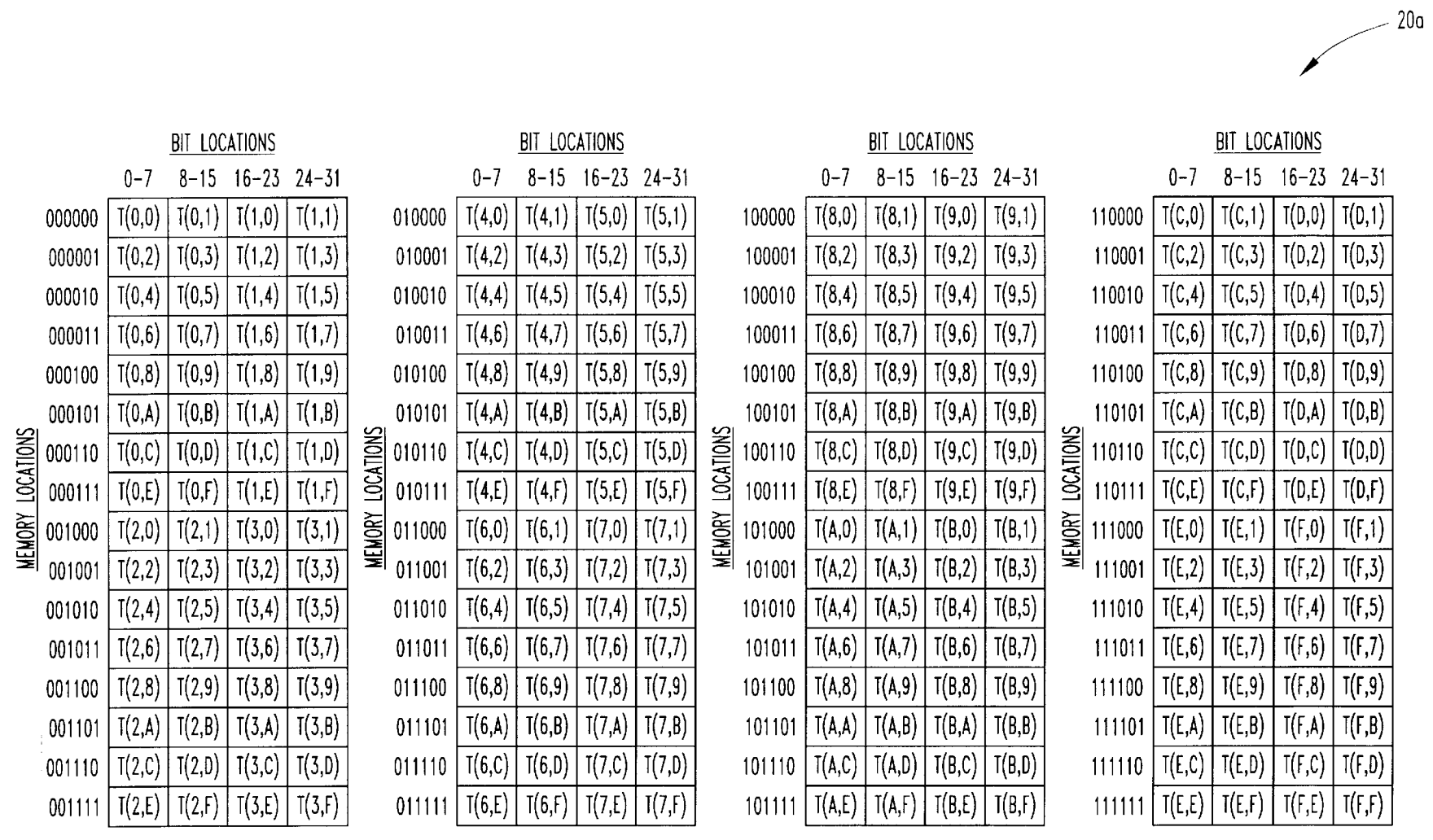

FIG. 7 is an illustration of storage matrixes 12a–12bl of texture map matrix 10. The number of data points per storage matrix is four because the bit size of data points T(0,0)–T(F,F) is eight bits, and the bit width of memory locations 000000–111111 of linear memory device 20a is thirty-two bits. Each storage matrix includes at least one pair of adjacent data points from adjacent rows of texture map matrix 10. For example, storage matrix 12a includes adjacent data points T(0,0) and T(1,0) from adjacent rows 0 and 1. FIG. 8 is an illustration of storage matrixes 12a–12bl sequentially stored within memory locations 000000–111111 of linear memory device 20a. It is to be appreciated and understood that storing storage matrixes 12a–12bl within memory locations 000000–111111 of linear memory device 20a creates a nonlinear storage arrangement of data points T(0,0)–T(F,F) within linear memory device 20a.

Figure 2:
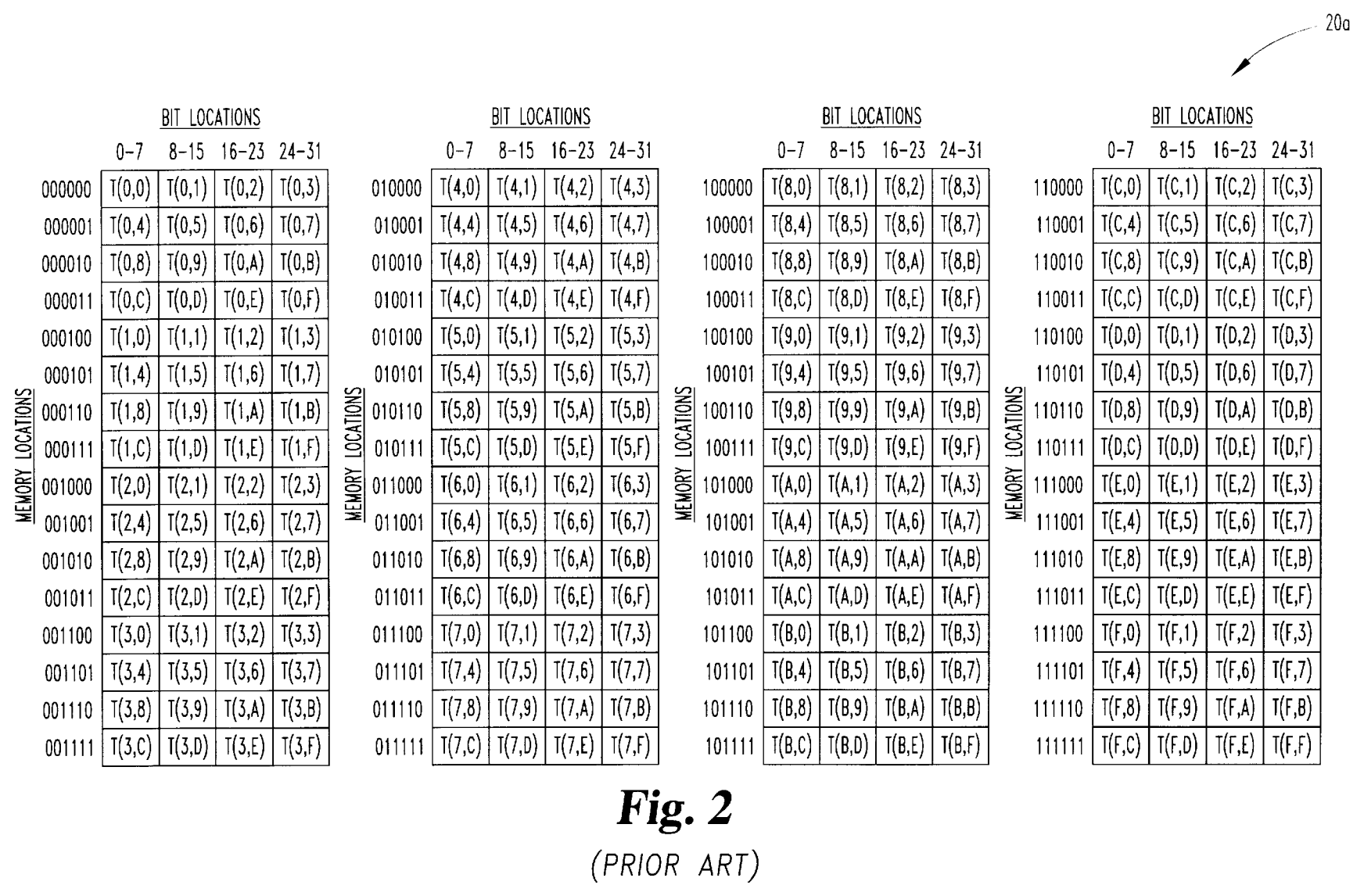

Each storage matrix 12a–12bl represents a distinct texel matrix. Consequently, a texel calculation involving data points from one storage matrix requires only one memory read of linear memory device 20a, a texel calculation involving data points from two storage matrixes requires only two memory reads of linear memory device 20a, and a texel calculation involving data points from four storage matrixes requires only four memory reads of linear memory device 20a. It is to be appreciated and understood that the storing storage matrixes 12a–12bl within linear memory device 20a causes a reduction in the actual number of memory reads of linear memory device 20a for a significant percentage of the texel matrixes of texture map matrix 10 as compared to the linear arrangement of texture map matrix 10 as illustrated in FIG. 2. For example, referring back to FIG. 8, prior to executing a texel calculation of texel matrix 11a, a memory read of memory location 000000 is required in order to retrieve data points T(0,0), T(0,1), T(1,0), T(1,1). This is to be compared to memory reads of memory locations 000000 and 000100 of linear memory device 20a when data points T(0,0), T(0,1), T(1,0) and T(1,1) are in a linear storage arrangement within linear memory device 20a as illustrated in FIG. 2. The required memory reads for the execution of a texel calculation of other texel matrixes involving data points from one storage matrix, such as texel matrix, 11e is also reduced from two memory reads to one memory read.

In addition, referring back to FIG. 8, prior to executing a texel calculation of texel matrix 11b, memory reads of memory locations 010001 and 010010 are required in order to retrieve data points T(4,3), T(4,4), T(5,3) and T(5,4). This is to be compared to memory reads of memory locations 010000, 010001, 010100 and 010101 of linear memory device 20a when data points T(4,3), T(4,4), T(5,3) and T(5,4) are in a linear storage arrangement within linear memory device 20a as illustrated in FIG. 2. The required memory reads for the execution of a texel calculation of other texel matrixes involving data points from two storage matrixes, such as texel matrix 11c, is also reduced from four memory reads to two memory reads. For the remaining texel calculations of texel matrixes involving data points from four storage matrixes, such as texel matrix 11d, four memory reads are still required. As a result of the aforementioned reductions, one memory read of linear memory device 20a is required for 25% of the possible texel calculations, two memory reads of linear memory device 20a are required for 50% of the possible texel calculations and four memory reads of linear memory device 20a are required for 25% of possible texel calculations. Therefore, due to the nonlinear stored arrangement of texture map matrix 10 in linear memory device 20a as illustrated in FIG. 8, the average number of memory reads during the execution of all possible texel calculations of texture map matrix 10 is 2.25 memory reads. This is a reduction of 0.25 memory reads from the linear arrangement of texture map matrix 10 within linear memory device 20a as illustrated in FIG. 2.

The present invention further contemplates that modified texel calculations can be performed. Referring back to FIG. 7, it is to be appreciated and understood that the number of memory reads required to execute a modified texel calculation involving data points from one or two storage matrixes of storage matrixes 12a–12bl is the same as the number of memory reads to execute a texel calculation involving data points from one or two storage matrixes of storage matrixes 12a–12bl. By contrast, the number of memory reads required to execute a modified texel calculation involving data points from four storage matrixes of storage matrixes 12a–12bl, such as texel matrix 11d, is reduced from four memory reads, as required by a texel calculation, to two memory reads. Specifically, referring back to FIG. 8, a texel calculation of texel matrix 11d requires memory reads of memory locations 101101, 101110, 110101 and 110110 in order to retrieve data points T(B,B), T(B,C), T(C,B) and T(C,C), while a modified texel calculation of texel matrix 11d wherein data point T(B,B) is the most heavily weighed data point only requires memory reads of memory locations 101101 and 110110 in order to retrieve data points T(B,B) and T(C,C).

As a result, one memory read of linear memory device 20a is required for 25% of the possible modified texel calculations, and two memory reads of linear memory device 20a are required for 75% of the possible modified texel calculations. Thus, due to the nonlinear stored arrangement of texture map matrix 10 in linear memory device 20a as illustrated in FIG. 8, the average number of memory reads during the execution of all possible modified texel calculations of texture map matrix 10 is 1.75 memory reads. This is a further reduction of 0.50 memory reads from the linear arrangement of texture map matrix 10 within linear memory device 20a as illustrated in FIG. 2.

Figure 9:
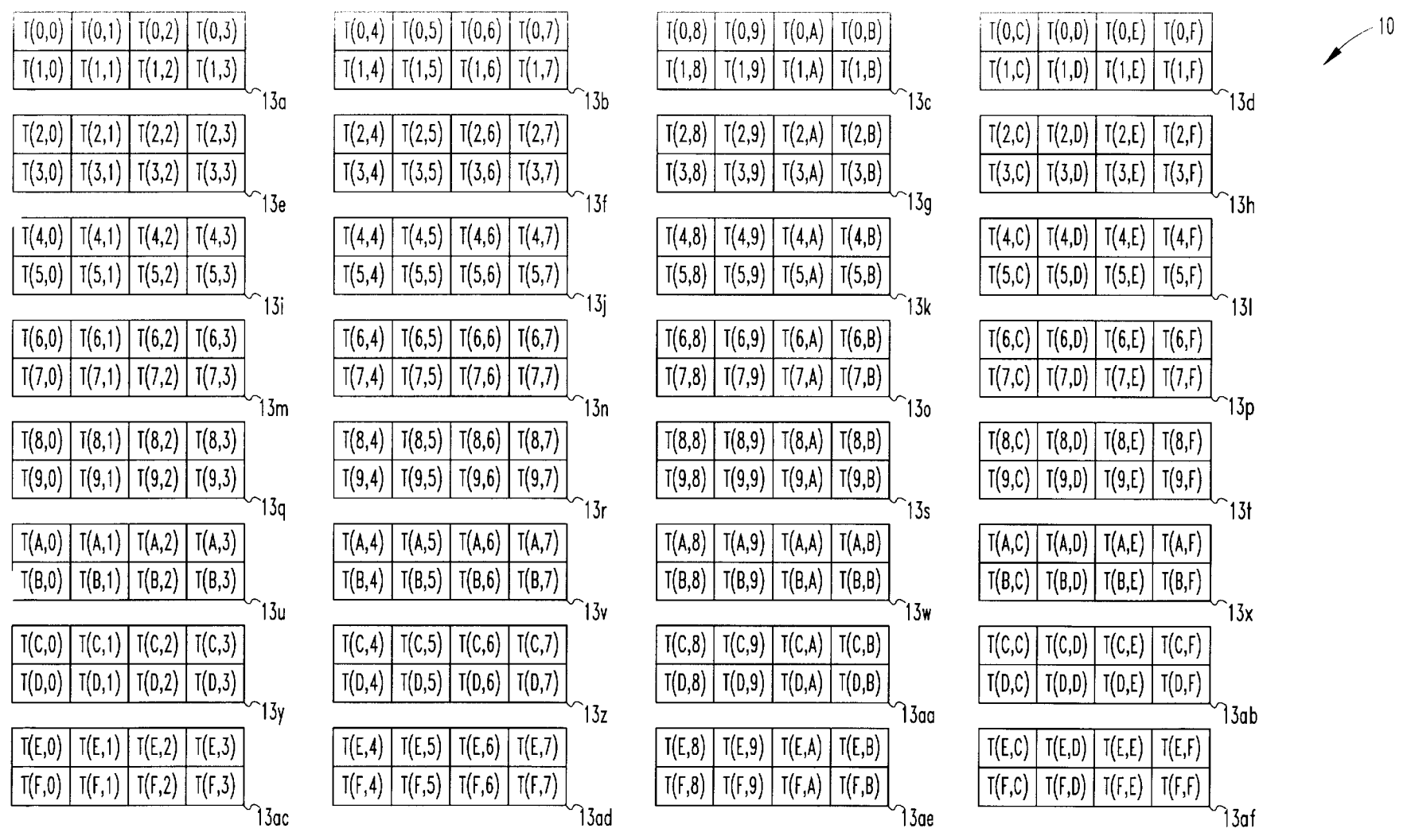

FIG. 9 is an illustration of storage matrixes 13a–13af of texture map matrix 10. The number of data points per storage matrix is eight because the bit size of data points T(0,0)–T(F,F) is eight bits, and the bit width of memory locations 000000–011111 of linear memory device 20b is sixty-four bits. Each storage matrix includes at least one pair of adjacent data points from adjacent rows of texture map matrix 10. For example, storage matrix 13a includes adjacent data points T(0,1) and T(1,1) from adjacent rows 0 and 1. While FIG. 9 illustrates storage matrixes 13a–13af as having two rows and four columns of adjacent data points, the present invention contemplates that storage matrixes 13a–13af can have four rows and two columns of adjacent data points. FIG. 10 is an illustration of storage matrixes 13a–13af sequentially stored within memory locations 000000–011111 of linear memory device 20b. It is to be appreciated and understood that storing storage matrixes 13a–13af within memory locations 000000–011111 of linear memory device 20b creates a nonlinear storage arrangement of data points T(0,0)–T(F,F) within linear memory device 20b.

Each storage matrix 13a–13af includes three distinct texel matrixes. For example, storage matrix 13a includes texel matrix 11a, a texel matrix of data points T(0,1), T(0,2), T(1,1) and T(1,2), and a texel matrix of data points T(0,2), T(0,3), T(1,2) and T(1,3). As described herein for storage matrixes 12a–12bl, a texel calculation involving data points from one storage matrix also requires only one memory read of linear memory device 20b, a texel calculation involving data points from two storage matrixes also requires only two memory reads of linear memory device 20b, and a texel calculation involving data points from four storage matrixes also requires only four memory reads of linear memory device 20b. Therefore, it is to be appreciated and understood that storing storage matrixes 13a–13af within linear memory device 20b as illustrated in FIG. 10 also causes a reduction in the actual number of memory reads of linear memory device 20b for a significant percentage of the texel matrixes of texture map matrix 10 than the linear storage arrangement of texture map matrix 10 within linear memory device 20b as illustrated in FIG. 3.

It is to be further appreciated and understood that storing storage matrixes 13a–13af within linear memory device 20b as illustrated in FIG. 10 also causes a reduction in the actual number of memory reads of linear memory device 20b for a significant percentage of the texel matrixes of texture map matrix 10 than the storage of storage matrixes 12a–12bl within linear memory device 20a as illustrated in FIG. 8. For example, referring back to FIG. 10, prior to executing a texel calculation of a texel matrix of data points T(0,1), T(0,2), T(1,1) and T(1,2), a memory read of memory location 000000 is required in order to retrieve data points T(0,1), T(0,2), T(1,1) and T(1,2). This is to be compared to memory reads of memory locations 000000 and 0000101 of linear memory device 20b when data points T(0,1), T(0,2), T(1,1), T(1,2) are in a nonlinear storage arrangement within linear memory device 20a as illustrated in FIG. 8.

As a result of the aforementioned reductions, referring back to FIG. 10, one memory read of linear memory device 20b is required for 37.5% of the possible texel calculations, two memory reads of linear memory device 20b are required for 50% of the possible texel calculations and four memory reads of linear memory device 20b for 12.5% of possible texel calculations. Therefore, due to the nonlinear stored arrangement of texture map matrix 10 in linear memory device 20b, the average number of memory reads of linear memory device 20b during the execution of all possible texel calculations of texture map matrix 10 is 1.875 memory reads. This is a reduction of 0.375 reads from the linear storage arrangement of texture map matrix 10 within linear memory device 20b as illustrated in FIG. 3.

The present invention further contemplates that modified texel calculations can be performed. Referring back to FIG. 9, it is to be appreciated and understood that the number of memory reads required to execute a modified texel calculation involving data points from one or two storage matrixes of storage matrixes 13a–13af is the same as the number of memory reads to execute a texel calculation involving data points from one or two storage matrixes of storage matrixes 13a–13af. By contrast, the number of memory reads required to execute a modified texel calculation involving data points from four storage matrixes of storage matrixes 13a–13af, such as texel matrix 11d, is reduced from four memory reads, as required by a texel calculation, to two memory reads. Specifically, referring back to FIG. 10, a texel calculation of texel matrix 11d requires memory reads of memory locations 101101, 101110, 110101 and 110110 in order to retrieve data points T(B,B), T(B,C), T(C,B) and T(C,C), while a modified texel calculation of texel matrix 11d wherein data point T(B,B) is the most heavily weighed data point only requires memory reads of memory locations 101101 and 110110 in order to retrieve data points T(B,B) and T(C,C).

As a result, one memory read of linear memory device 20b is required for 37.5% of the possible modified texel calculations, and two memory reads of linear memory device 20b are required for 62.5% of the possible modified texel calculations. Thus, due to the nonlinear stored arrangement of texture map matrix 10 in linear memory device 20b as illustrated in FIG. 10, the average number of memory reads during the execution of all possible modified texel calculations of texture map matrix 10 is 1.625 memory reads. This is a further reduction of 0.25 memory reads from the linear arrangement of texture map matrix 10 within linear memory device 20b as illustrated in FIG. 3.

Figure 11:
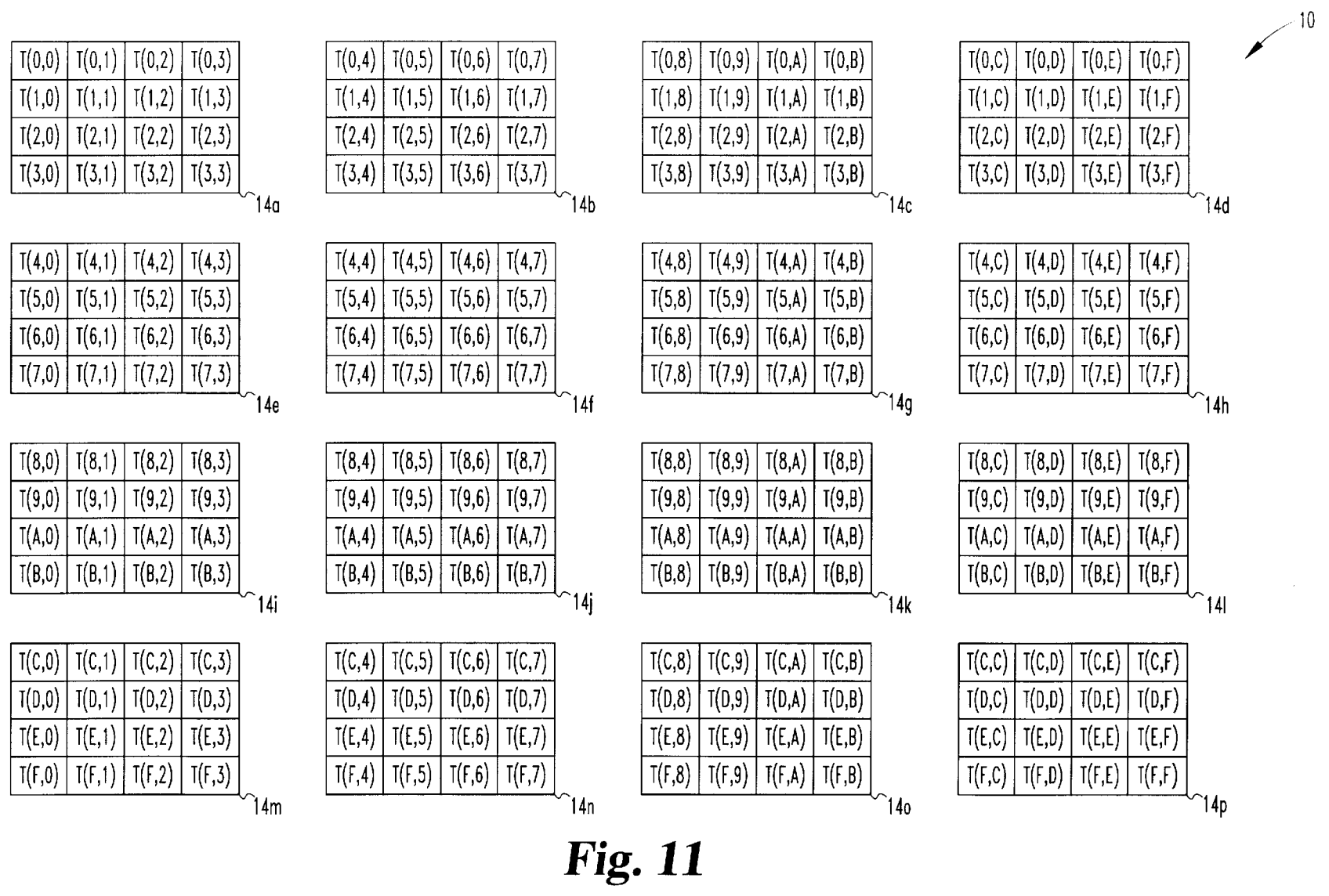

FIG. 11 is an illustration of storage matrixes 14a–14p of texture map matrix 10. The number of data points per storage matrix is sixteen because the bit size of data points T(0,0)–T(F,F) is eight bits, and the bit width of memory locations 000000–001111 of linear memory device 20c is 128 bits. Each storage matrix includes at least one pair of adjacent data points from adjacent rows of texture map matrix 10. For example, storage matrix 14a includes adjacent data points T(0,1) and T(1,1) from adjacent rows 0 and 1. While FIG. 11 illustrates storage matrixes 14a–14p as having four rows and four columns of adjacent data points, the present invention contemplates that storage matrixes 14a–14p can have either eight rows and two columns of adjacent data points, or two rows and eight columns of adjacent data points. FIG. 12 is an illustration of storage matrixes 14a–14p sequentially stored within memory locations 000000–001111 of linear memory device 20c. It is to be appreciated and understood that storing storage matrixes 14a–14p within memory locations 000000–001111 of linear memory device 20c creates a nonlinear storage arrangement of data points T(0,0)–T(F,F) within linear memory device 20c.

Figure 4:
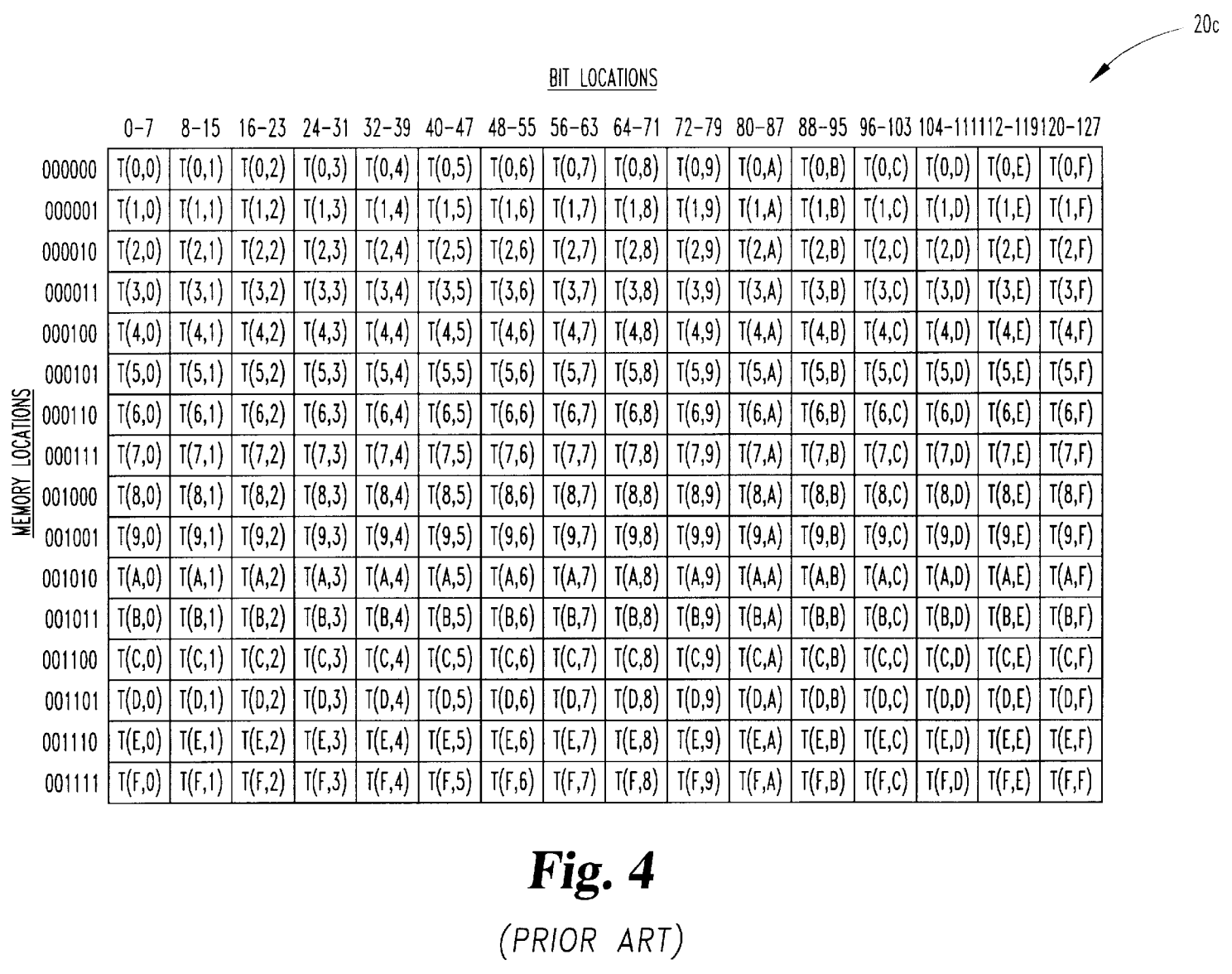

Each storage matrix 14a–14f includes nine distinct texel matrixes. For example, storage matrix 14a includes texel matrix 11a, a texel matrix of data points T(0,1), T(0,2), T(1,1) and T(1,2), a texel matrix of data points T(0,2), T(0,3), T(1,2) and T(1,3), a texel matrix of data points T(1,0), T(1,1), T(2,0) and T(2,1), a texel matrix of data points T(1,1), T(1,2), T(2,1) and T(2,2), a texel matrix of data points T(1,2), T(1,3), T(2,2) and T(2,3), a texel matrix of data points T(2,0), T(2,1), T(3,0) and T(3,1), a texel matrix of data points T(2,1), T(2,2), T(3,1) and T(3,2), and a texel matrix of data points T(2,2), T(2,3), T(3,2) and T(3,3). As described herein for storage matrixes 12a–12bl, a texel calculation involving data points from one storage matrix also requires only one memory read of linear memory device 20c, a texel calculation involving data points from two storage matrixes also requires only two memory reads of linear memory device 20c, and a texel calculation involving data points from four storage matrixes also requires only four memory reads of linear memory device 20c. Therefore, it is to be appreciated and understood that storing storage matrixes 14a–14p within linear memory device 20c as illustrated in FIG. 12 also causes a reduction in the actual number of memory reads of linear memory device 20c for a significant percentage of the texel matrixes of texture map matrix 10 than the linear storage arrangement of texture map matrix 10 within linear memory device 20c as illustrated in FIG. 4.

It is to be further appreciated and understood that storing storage matrixes 14a–14p within linear memory device 20c as illustrated in FIG. 12 also causes a reduction in the actual number of memory reads of linear memory device 20c for a significant percentage of the texel matrixes of texture map matrix 10 than the storage of storage matrixes 13a–13af within linear memory device 20b as illustrated in FIG. 10. For example, referring back to FIG. 12, prior to executing a texel calculation of a texel matrix of data points T(1,1), T(1,2), T(2,1) and T(2,2), a memory read of memory location 000000 is required in order to retrieve data points T(1,1), T(1,2), T(2,1) and T(2,2). This is to be compared to memory reads of memory locations 000000 and 0000100 of linear memory device 20b when data points T(0,1), T(0,2), T(1,1), T(1,2) are in a nonlinear storage arrangement within linear memory device 20b as illustrated in FIG. 10.

As a result of the aforementioned reductions, referring back to FIG. 12, one memory read of linear memory device 20c is required for approximately 54.55% of the possible texel calculations, two memory reads of linear memory device 20c are required for approximately 36.36% of the possible texel calculations and four memory reads of linear memory device 20c for approximately 9.09% of the possible texel calculations. Therefore, due to the nonlinear stored arrangement of texture map matrix 10 in linear memory device 20c, the average number of memory reads of linear memory device 20c during the execution of all possible texel calculations of texture map matrix 10 is approximately 1.636 memory reads. This is an approximate reduction of 0.364 reads from the linear storage arrangement of texture map matrix 10 within linear memory device 20c as illustrated in FIG. 4.

The present invention further contemplates that modified texel calculations can be performed. Referring back to FIG. 11, it is to be appreciated and understood that the number of memory reads required to execute a modified texel calculation involving data points from one or two storage matrixes of storage matrixes 14a–14p is the same as the number of memory reads to execute a texel calculation involving data points from one or two storage matrixes of storage matrixes 14a–14p. By contrast, the number of memory reads required to execute a modified texel calculation involving data points from four storage matrixes of storage matrixes 14a–14p, such as texel matrix 11d, is reduced from four memory reads, as required by a texel calculation, to two memory reads. Specifically, referring back to FIG. 12, a texel calculation of texel matrix 11d requires memory reads of memory locations 001010, 001011, 001110 and 001111 in order to retrieve data points T(B,B), T(B,C), T(C,B) and T(C,C), while a modified texel calculation of texel matrix 11d wherein data point T(B,B) is the most heavily weighed data point only requires memory reads of memory locations 001010 and 001111 in order to retrieve data points T(B,B) and T(C,C).

As a result, one memory read of linear memory device 20c is required for approximately 54.55% of the possible modified texel calculations, and two memory reads of linear memory device 20c are required for 45.55% of the possible modified texel calculations. Thus, due to the nonlinear stored arrangement of texture map matrix 10 in linear memory device 20c as illustrated in FIG. 12, the average number of memory reads during the execution of all possible modified texel calculations of texture map matrix 10 is 1.454 memory reads. This is a further approximate reduction of 0.181 memory reads from the linear arrangement of texture map matrix 10 within linear memory device 20c as illustrated in FIG. 4.

Figure 13A:
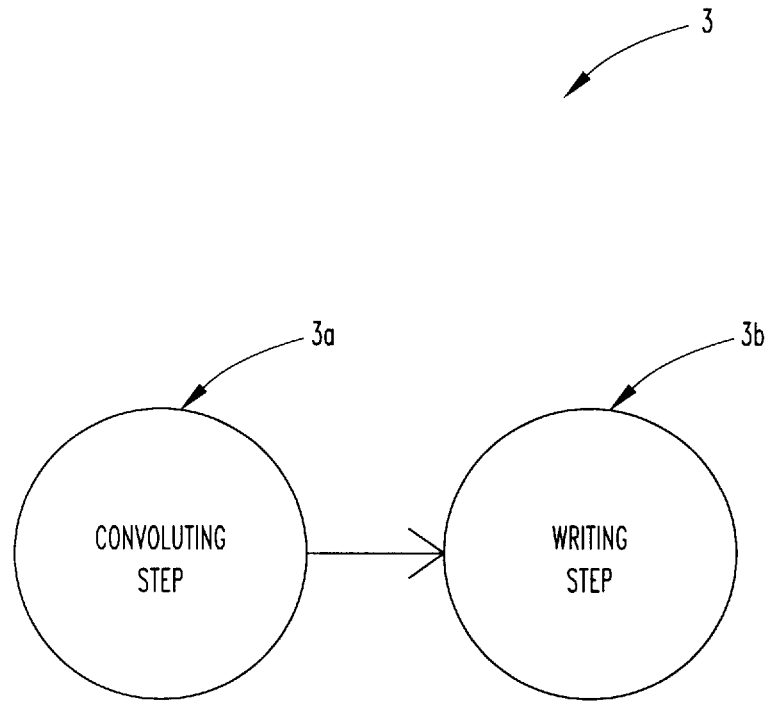
FIG. 13A is a flow diagram of a method 3 for storing texture map matrix 10 within a linear memory device in accordance with a second embodiment of the present invention.

FIG. 13A is a flow diagram of a method 3 of a second embodiment of the present invention. Method 3 includes a convoluting step 3a, and a writing step 3c. Convoluting step 3a involves the act of subdividing adjacent rows of a texture map matrix into two or more multi-data point groups, and the act of placing the multi-data point groups adjacent to each other to generate a linear string of data points. While the present invention contemplates that the act of subdividing adjacent rows of a texture map matrix is based on half of either a determined or predetermined maximum number of data points per memory location of a linear memory device, the act of subdividing adjacent rows of a texture map matrix can be based on any arbitrary number. Writing step 3b involves the act of writing the linear string from the convoluting step into memory locations of a linear memory device. The result of executing method 3 is a nonlinear storage arrangement of texture map matrix 10 within a linear memory device.

FIG. 13B is a block diagram of a system 4 of a second embodiment of the present invention. System 4 comprises a linear memory device 20, a convoluting circuit 5 and a writing circuit 6. Linear memory device 20 includes a plurality of memory locations. While the present invention contemplates that linear memory device 20 is a main memory or a graphics frame memory of system 4, linear memory device 20 can be represent any type of memory for system 4. Further, the present invention contemplates that the memory locations of linear memory device 20 can be any bit width.

Convoluting circuit 5 is circuitry designed and/or programmed to perform convoluting step 3a in consideration of linear memory device 20. While the present invention contemplates that convoluting circuit 5 subdivides adjacent rows of a texture map matrix by the half the maximum number of data points per memory location of a linear memory device, convoluting circuit 5 can subdivide adjacent rows of a texture map matrix by any arbitrary number. Writing circuit 6 is circuitry designed and/or programmed to perform writing step 3b. The present invention contemplates that writing circuit 6 can write the linear string to sequential and/or nonsequential memory locations of linear memory device 20. The present invention further contemplates that writing circuit 6 can use either one or more bit locations of a memory location of linear memory device 20.

System 4 can further include a calculating circuit 7 which is designed and/or programmed to executed texel calculations and/or modified texel calculations on the linear string stored within linear memory device 20.

The following is a general description of the nonlinear storage arrangement of texture map matrix 10 within linear memory devices 20a, 20b, and 20c, respectively, in accordance with the second embodiment of the present invention.

Figure 14:
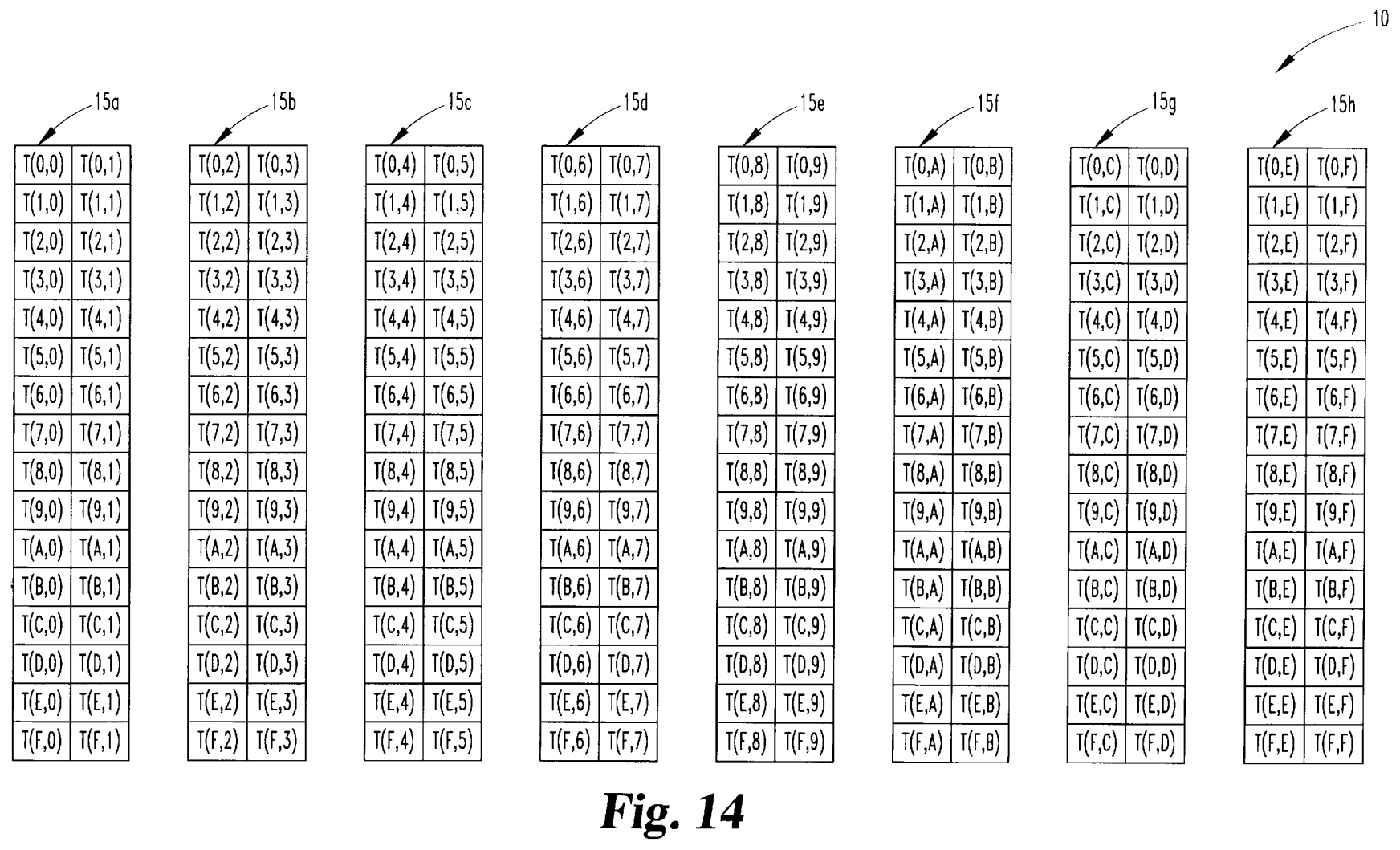
Figure 15A:
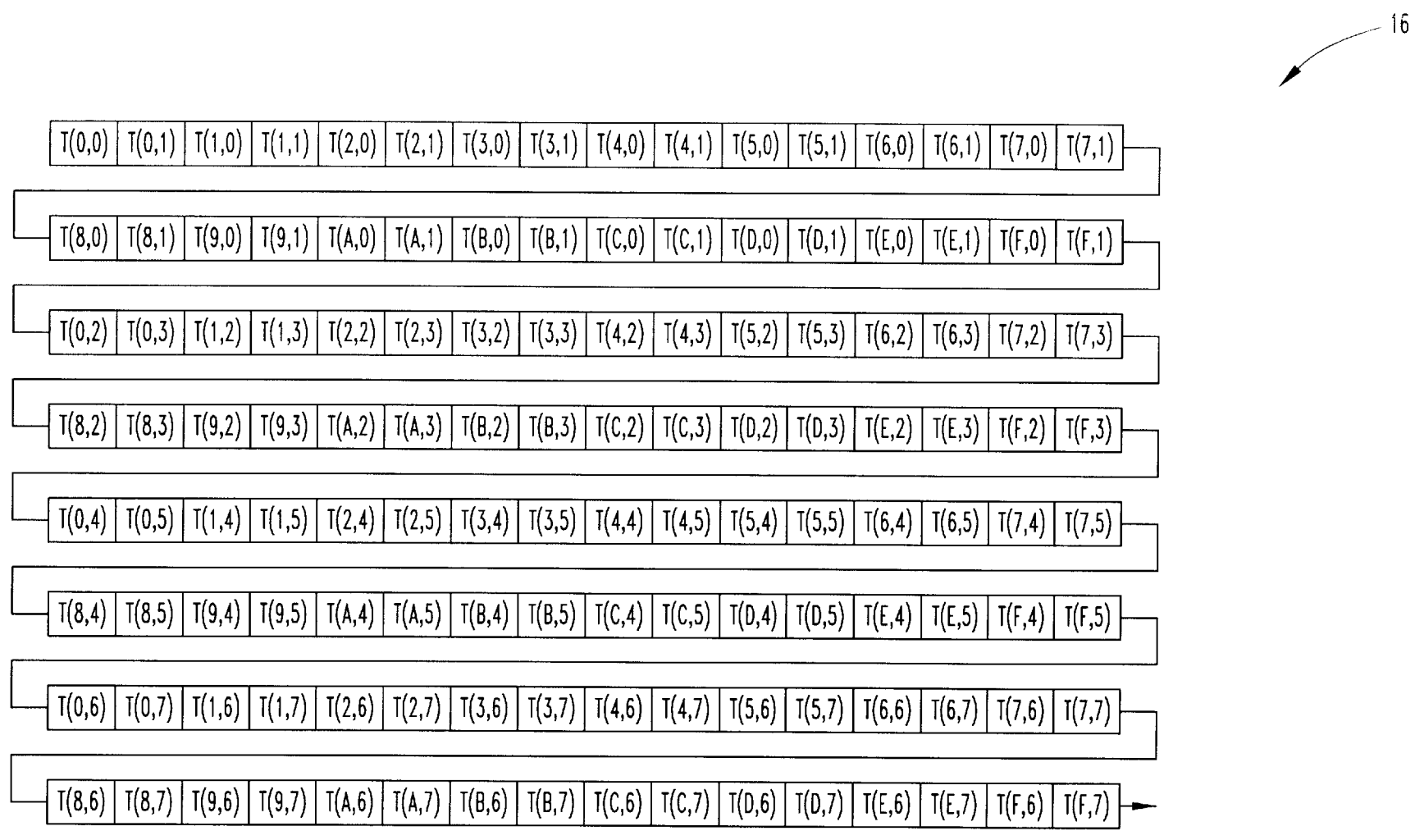
Figure 15B:
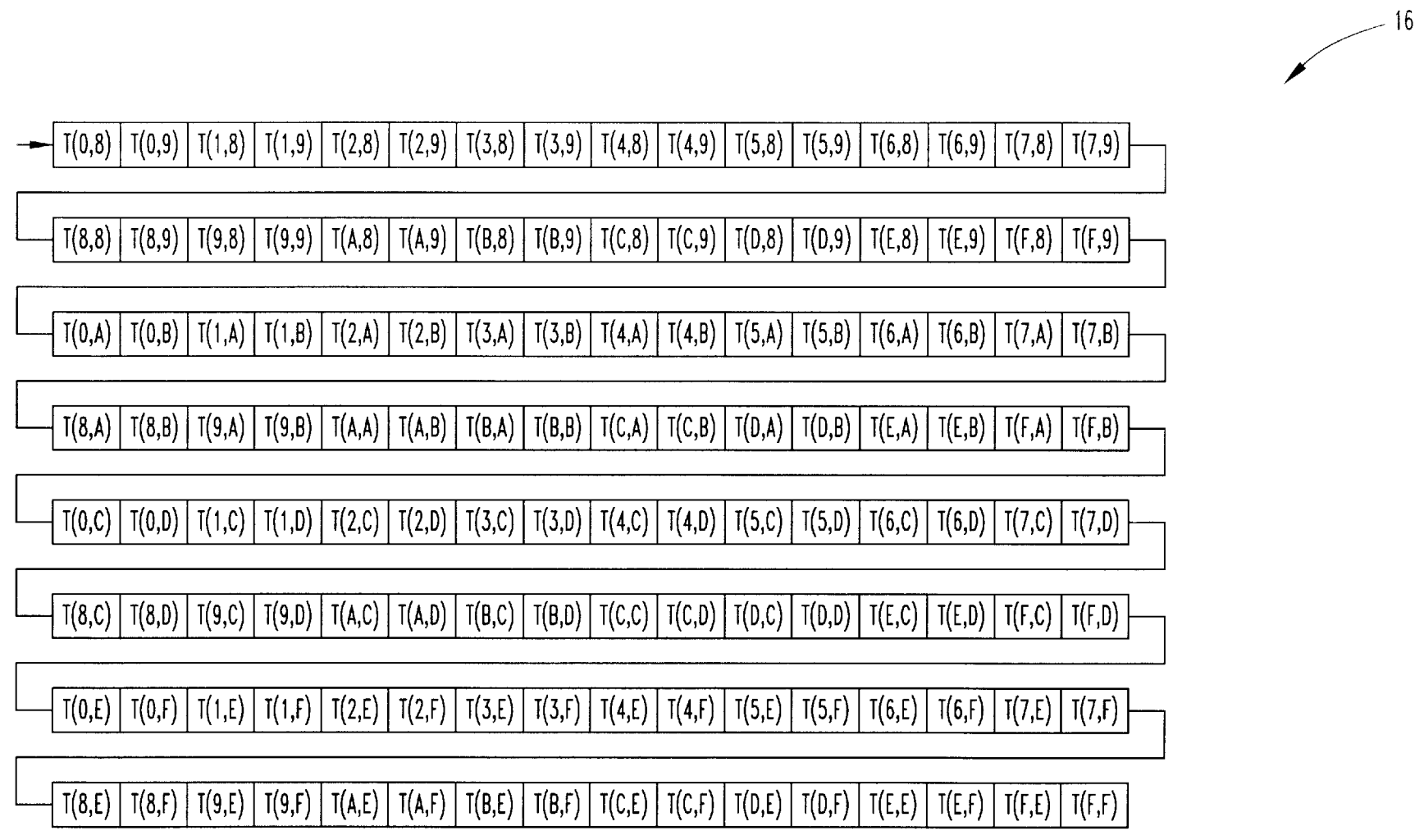

FIG. 14 is an illustration of multi-data point groups 15a–15h of texture map matrix 10. The number of columns per multi-data point group is two because the bit size of data points T(0,0)–T(F,F) is eight bits, and the bit width of memory locations 000000–111111 of linear memory device 20a is thirty-two bits. Multi-data point groups 15a–15h are rearranged by placing adjacent multi-data point groups next to each other in order to generate a linear string 16. FIG. 15A and FIG. 15B are an illustration of a first portion and a second portion of linear string 16, respectively. The present invention contemplates that linear string 16 can be sequentially and/or nonsequentially stored within memory locations of linear memory device 20a. It is to be appreciated and understood that storing linear string 16 within linear memory device 20a creates a nonlinear arrangement of data points T(0,0)–T(F,F) within linear memory device 20a. It is to be further appreciated and understood that storing linear string 16 within linear memory device 20a causes a reduction in the average number of reads during the execution of all possible texel calculations and modified texel calculations as compared to the linear arrangement of texture map matrix 10 within linear memory device 20a as illustrated in FIG. 2. This reduction is similar to the reduction caused by the nonlinear arrangement of storage matrixes 12a–12bl within linear memory device 20a as described herein.

Figure 16:
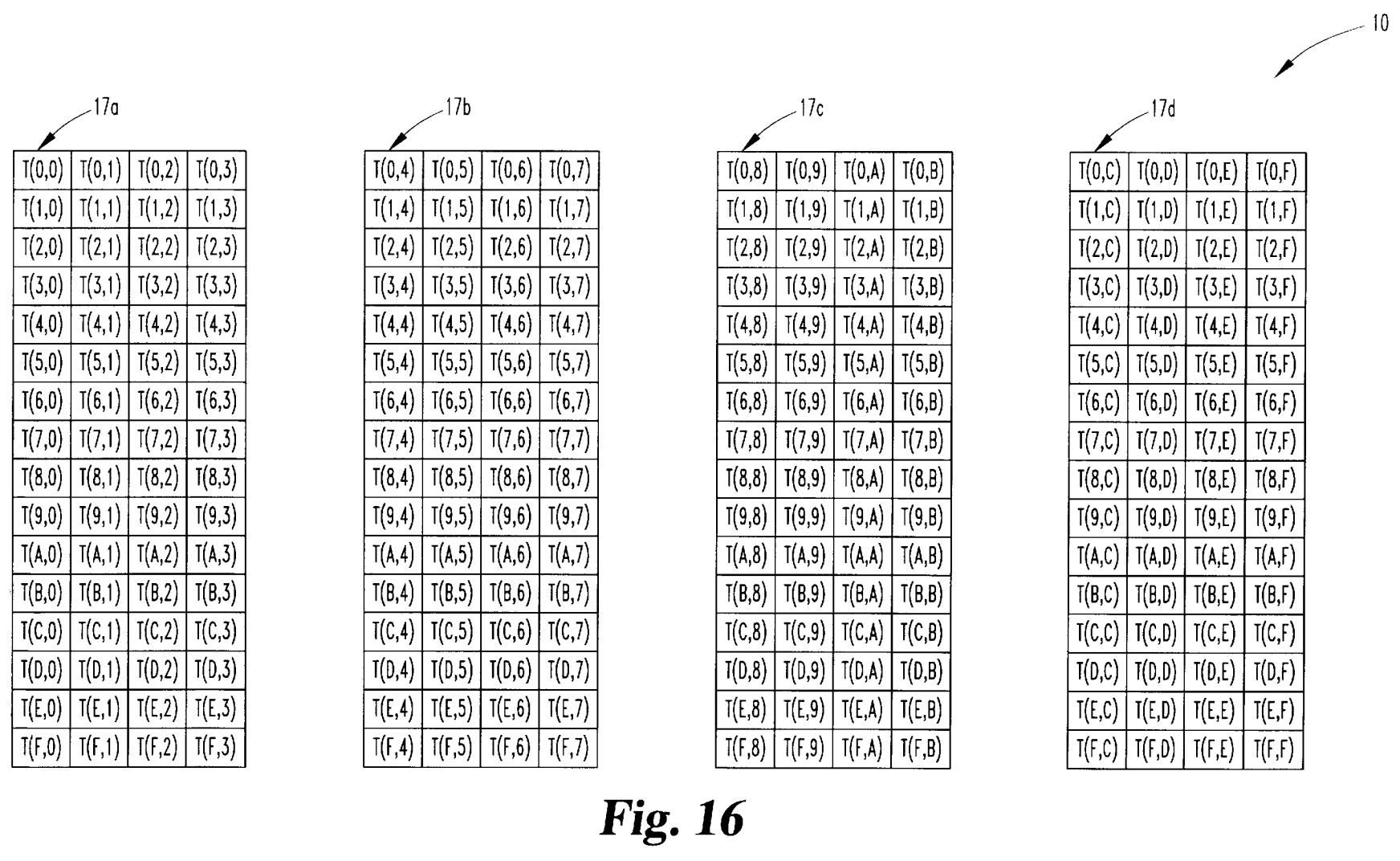
Figure 17A:
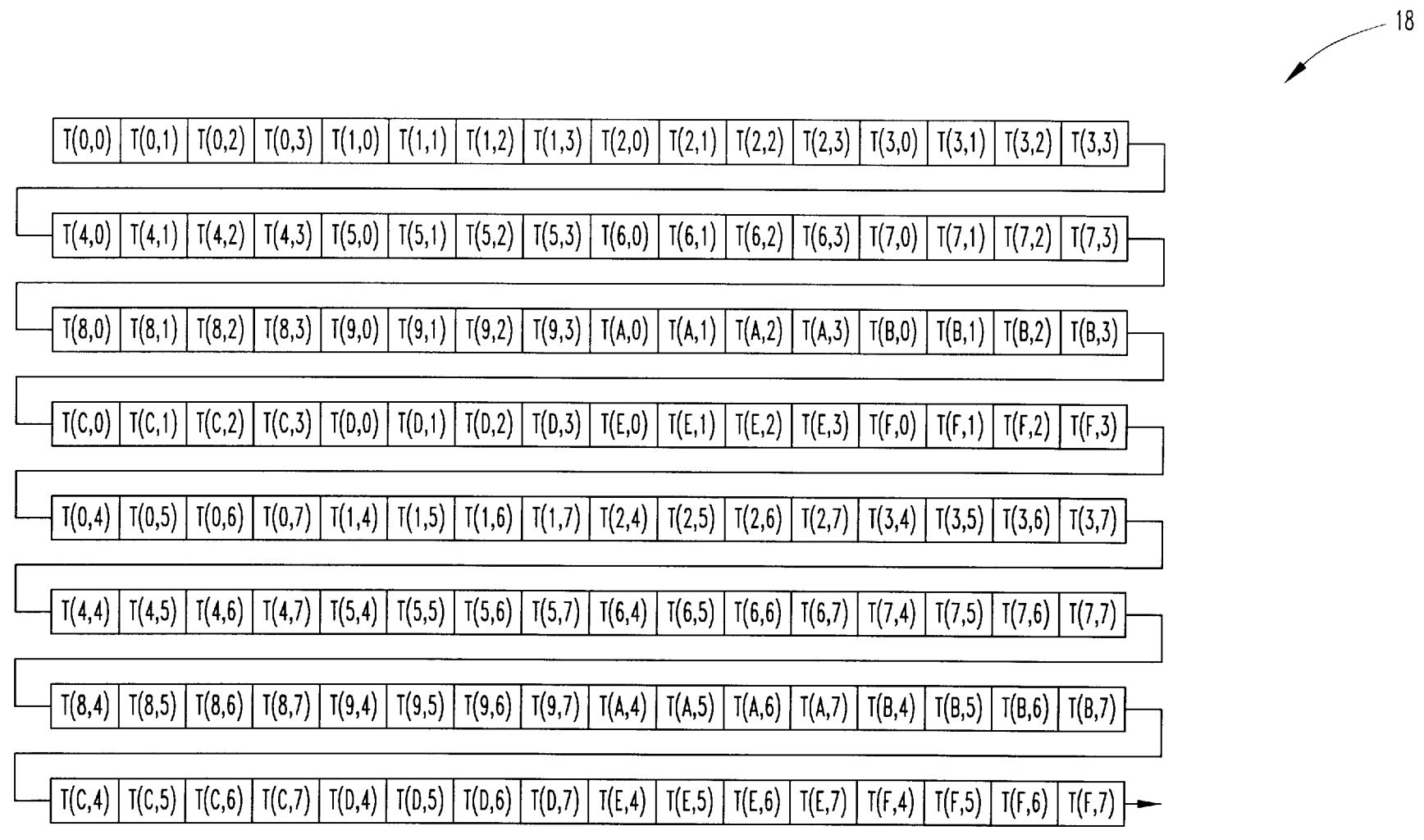
Figure 17B:
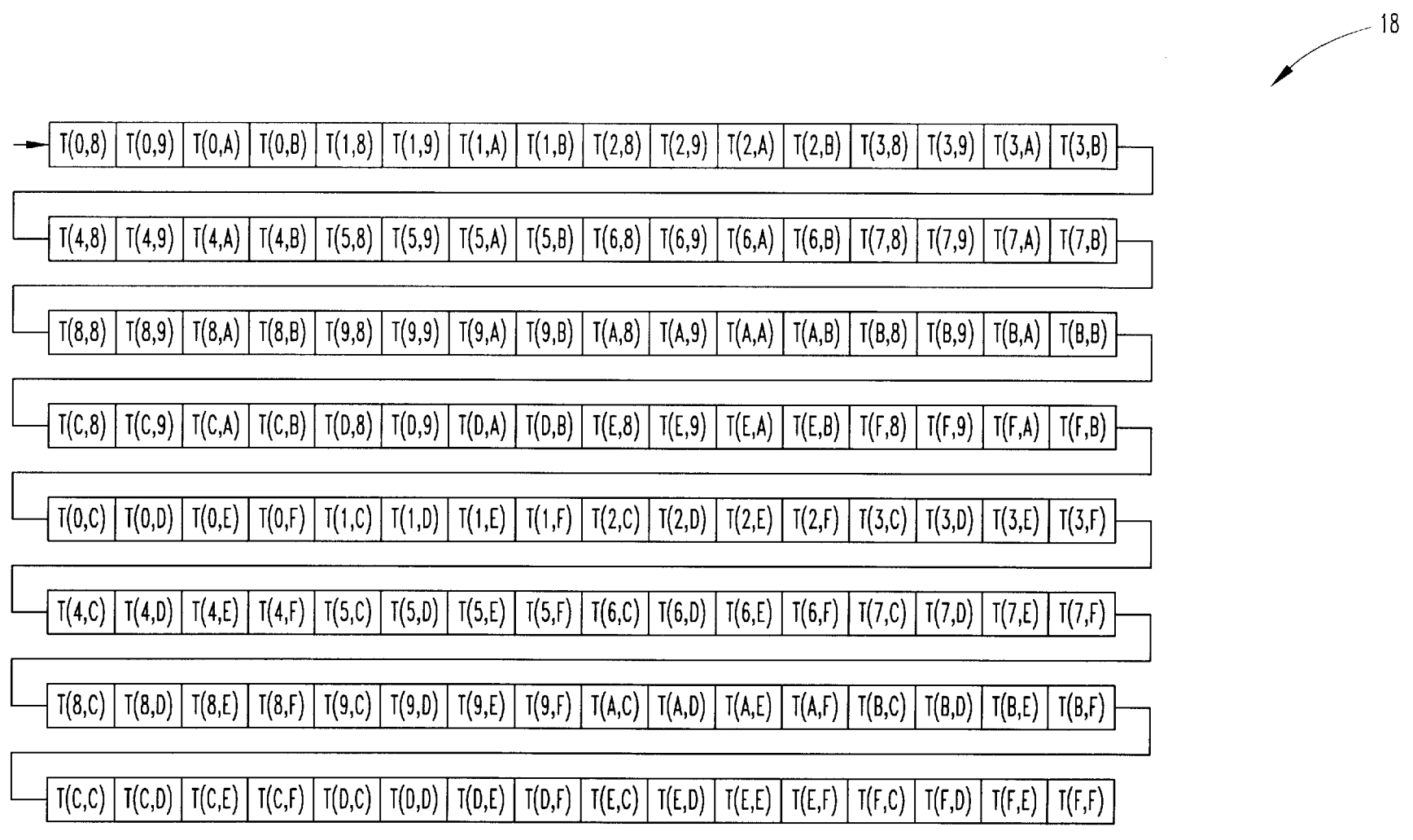

FIG. 16 is an illustration of multi-data point groups 17a–17d of texture map matrix 10. The number of columns per multi-data point group is four because the bit size of data points T(0,0)–T(F,F) is eight bits, and the bit width of memory locations 000000–111111 of linear memory device 20a is sixty-four bits. Multi-data point groups 17a–17d are rearranged by placing adjacent multi-data point groups next to each other in order to generate a linear string 18. FIG. 17A and FIG. 17B are an illustration of a first portion and a second portion of linear string 18, respectively. The present invention contemplates that linear string 18 can be sequentially and/or nonsequentially stored within memory locations of linear memory device 20b. It is to be appreciated and understood that storing linear string 18 within linear memory device 20b creates a nonlinear arrangement of data points T(0,0)–T(F,F) within linear memory device 20b. It is to be further appreciated and understood that storing linear string 18 within linear memory device 20b causes a reduction in the average number of reads during the execution of all possible texel calculations and modified texel calculations as compared to the linear arrangement of texture map matrix 10 within linear memory device 20b as illustrated in FIG. 3. This reduction is similar to the reduction caused by the nonlinear arrangement of storage matrixes 13a–13af within linear memory device 20b as described herein.

Figure 18:
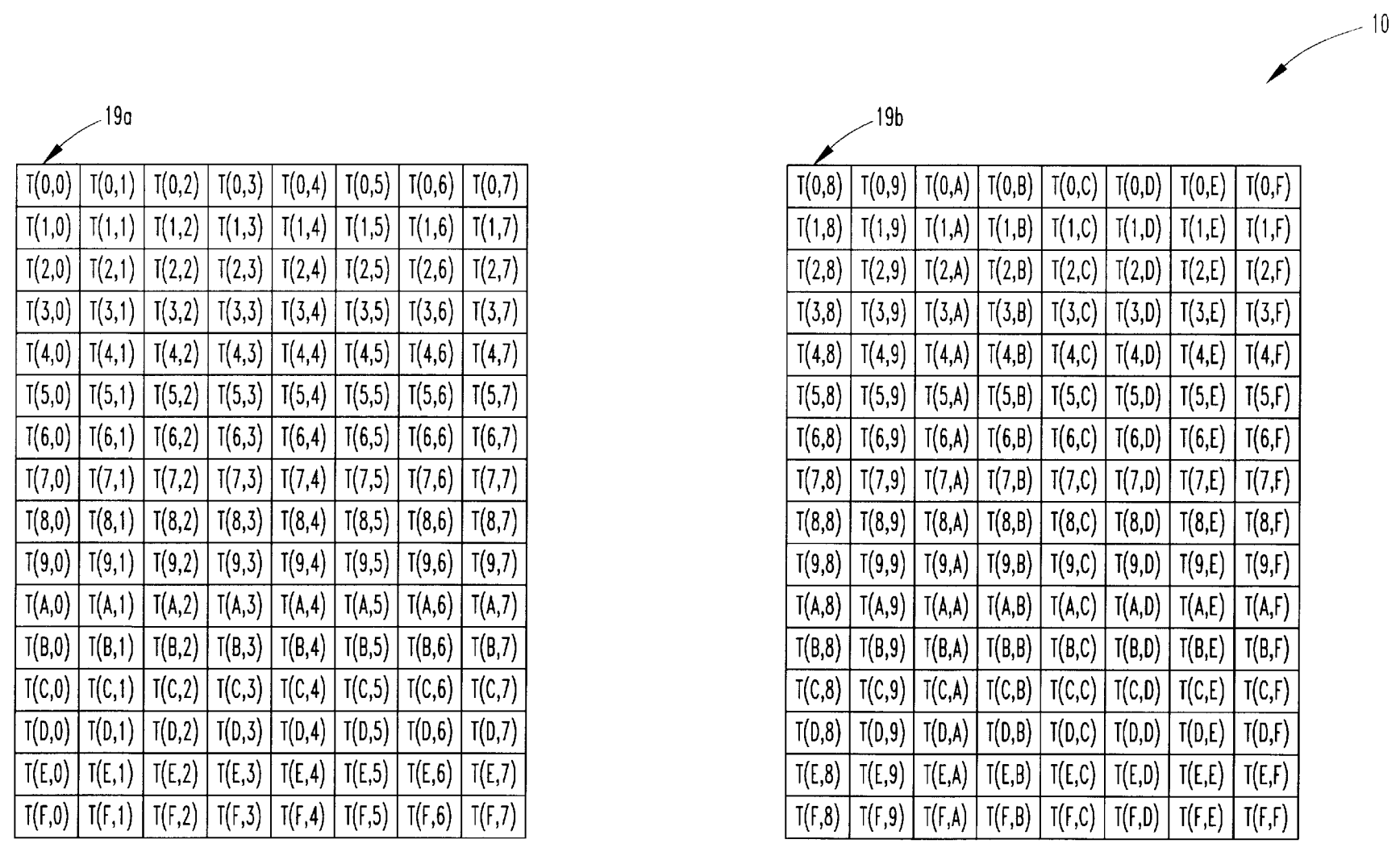
Figure 19A:
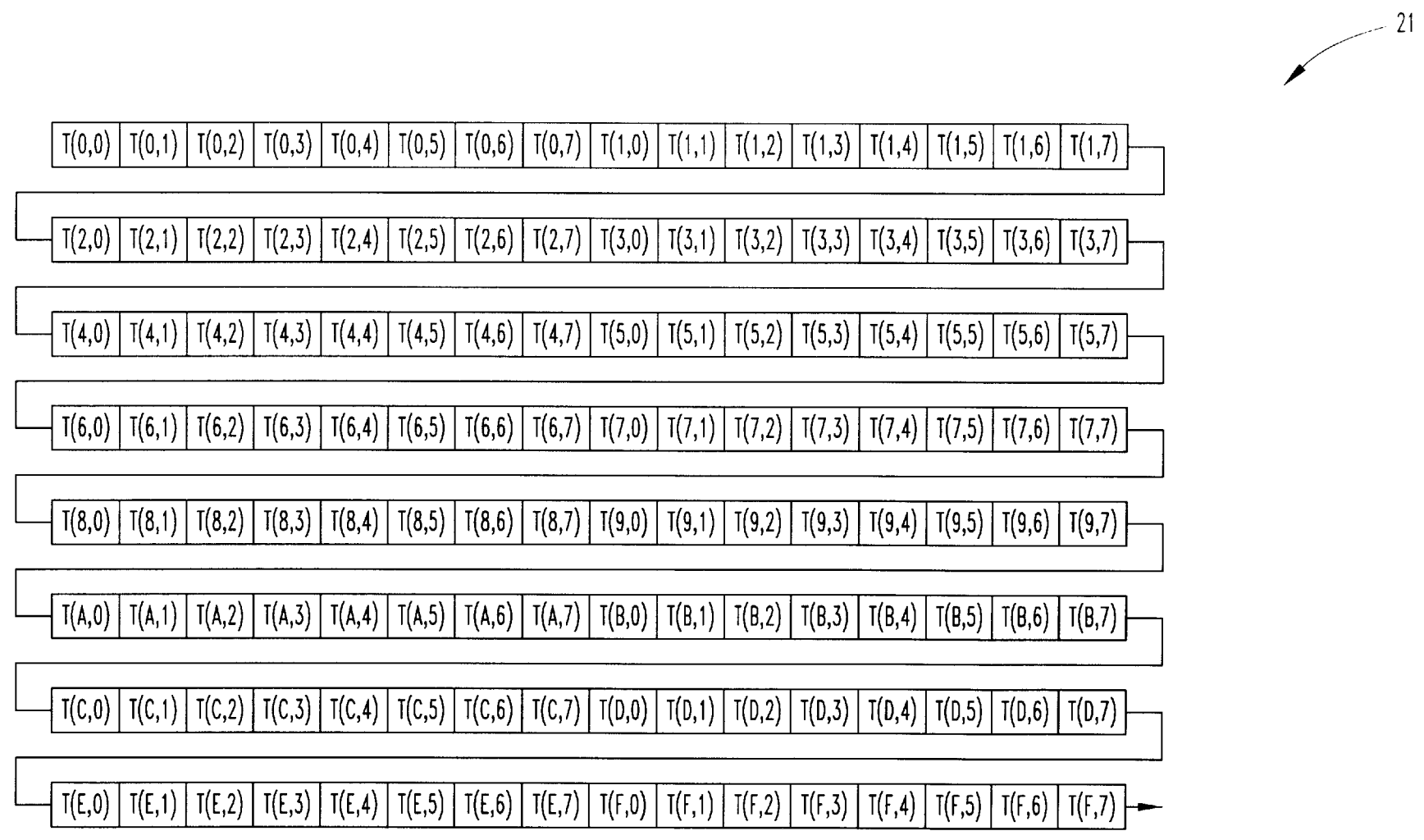
Figure 19B:
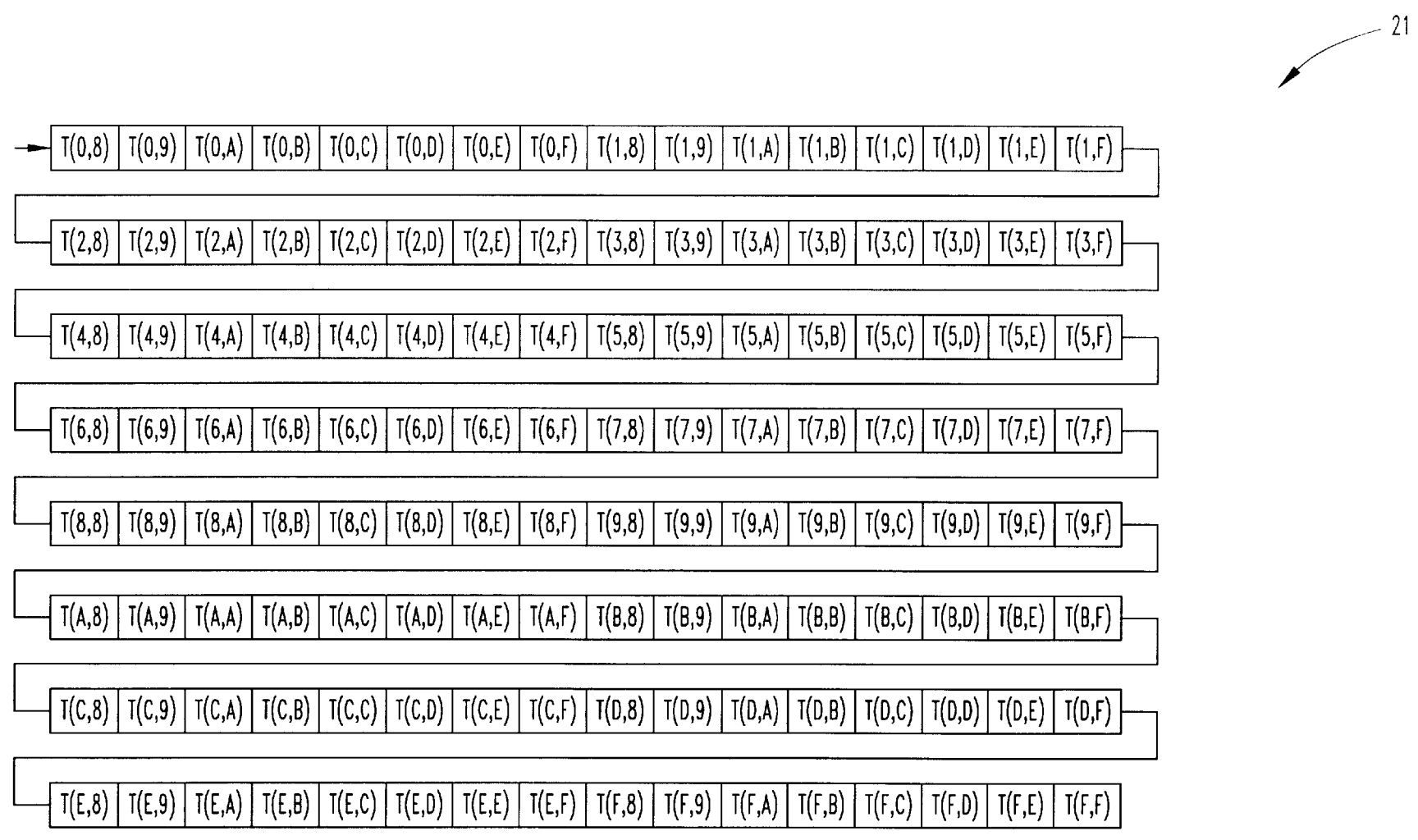

FIG. 18 is an illustration of multi-data point groups 19a and 19b of texture map matrix 10. The number of columns per multi-data point group is eight because the bit size of data points T(0,0)–T(F,F) is eight bits, and the bit width of memory locations 000000–111111 of linear memory device 20a is 128 bits. Multi-data point groups 19a and 19b are rearranged by placing the adjacent multi-data point groups next to each other in order to generate a linear string 21. FIG. 19A and FIG. 19B are an illustration of a first portion and a second portion of linear string 21, respectively. The present invention contemplates that linear string 21 can be sequentially and/or nonsequentially stored within memory locations of linear memory device 20c. It is to be appreciated and understood that storing linear string 21 within linear memory device 20c creates a nonlinear arrangement of data points T(0,0)–T(F,F) within linear memory device 20c. It is to be further appreciated and understood that storing linear string 21 within linear memory device 20c causes a reduction in the average number of reads during the execution of all possible texel calculations and modified texel calculations as compared to the linear arrangement of texture map matrix 10 within linear memory device 20c as illustrated in FIG. 4. This reduction is similar to the reduction caused by the nonlinear arrangement of storage matrixes 14a–14p within linear memory device 20c as described herein.

While the present invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A method for the nonlinear storage of a plurality of data points of a texture map matrix within a plurality of memory locations of a linear memory device, the method comprising the steps of:

(a) determining the maximum number of the data points capable of being written to each memory location during a writing cycle to the linear memory device;

(b) based on said maximum number of the data points determined in step (a), grouping the plurality of data points into at least two storage matrices, each storage matrix including at least one pair of adjacent data points from two adjacent rows of the texture map matrix; and (c) writing each storage matrix to a distinct memory location of the linear memory device.

2. The method of claim 1 wherein step (c) is writing each storage matrix to sequential memory locations of the linear memory device.

3. The method of claim 1 wherein step (c) is writing each storage matrix to nonsequential memory locations of the linear memory device.

4. The method of claim 1 further comprising a step (d) for executing at least one texel calculation.

5. The method of claim 1 further comprising a step (d) for executing at least one modified texel calculation.

6. A system for the nonlinear storage of a plurality of data points of a texture map matrix, the system comprising:

a linear memory device including a plurality of memory locations; and a processing circuit coupled to said linear memory device, said processing circuit including a determining means for determining the maximum number of the data points capable of being written to each memory location during a write cycle to said linear memory device, a matrix generating means for grouping the plurality of data points into at least two storage matrices based on the maximum number of the data points determined by said determining means, each storage matrix including at least one pair of adjacent data points from two adjacent rows of the texture map matrix, and a storing means for writing each storage matrix from said matrix generating means to a distinct memory location of said linear memory device.

7. The system of claim 6 wherein said storing means sequentially writes each storage matrix from said matrix generating means to a distinct memory location of said linear memory device.

8. The system of claim 6 wherein said storing means nonsequentially writes each storage matrix from said matrix generating means to a distinct memory location of said linear memory device.

9. The system of claim 6 wherein the processing circuit further includes a means for executing at least one texel calculation, said executing means coupled to said linear memory device.

10. The system of claim 6 wherein the processing circuit further includes a means for executing at least one modified texel calculation, said executing means coupled to said linear memory device.

11. A method for the nonlinear storage of a plurality of data points of a texture map matrix within a plurality of memory locations of a linear memory device, the method comprising the steps of:

(a) subdividing adjacent rows of the texture map matrix into a plurality of multi-data point groups, each multi-data point group having a plurality of adjacent rows of data points;

(b) placing said multi-data point groups adjacent to each other in order to create a linear string; and (c) writing said linear string to the plurality of memory locations.

12. The method of claim 11 wherein step (c) is writing said linear string to sequential memory locations of the linear memory device.

13. The method of claim 11 wherein step (c) is writing said linear string to nonsequential memory locations of the linear memory device.

14. The method of claim 11 further comprising a step (d) for executing at least one texel calculation.

15. The method of claim 11 further comprising a step (d) for executing at least one modified texel calculation.

16. A system for the nonlinear storage of a plurality of data points of a texture map matrix, the system comprising:

a linear memory device including a plurality of memory locations;

a convoluting circuit coupled to said linear memory device, said convoluting circuit to rearrange the plurality of data points from the texture map matrix into a linear string by subdividing adjacent rows of the texture map matrix into a plurality of multi-data point groups, and by placing said multi-data point groups adjacent to each other; and a writing circuit coupled to said processor circuit and to said linear memory to write said linear string from said convoluting circuit to said linear memory device.

17. The system of claim 16 wherein said writing circuit writes said linear string from said convoluting circuit to sequential memory locations of said linear memory device.

18. The system of claim 16 wherein said writing circuit writes said linear string from said convoluting circuit to nonsequential memory locations of said linear memory device.

19. The system of claim 16 further comprising a calculating circuit coupled to said linear memory device to perform at least one texel calculation.

20. The system of claim 16 further comprising a calculating circuit coupled to said linear memory device to perform at least one modified texel calculation.

* * * * *

UNITED STATES PATENT AND TRADEMARK OFFICE
CERTIFICATE OF CORRECTION

PATENT NO. : 5,861,888
DATED : January 19, 1999
INVENTOR(S) : Morgan James Dempsey It is certified that error appears in the above-identified patent and that said Letters Patent is hereby corrected as shown below:

Cover Page, Insert - - [73] Assignee: VLSI Technology, Inc., San Jose, Calif. - -

Signed and Sealed this

First Day of February, 2000

Attest:

Attesting Officer

Q. TODD DICKINSON

Acting Commissioner of Patents and Trademarks